United States Patent [19]

Feng et al.

[11] Patent Number: 5,793,033
[45] Date of Patent: Aug. 11, 1998

[54] PORTABLE DATA COLLECTION DEVICE WITH VIEWING ASSEMBLY

[75] Inventors: Chen Feng; Ynjiun P. Wang, both of Fort Myers, Fla.

[73] Assignee: Metanetics Corporation, Fort Meyers, Fla.

[21] Appl. No.: 623,963

[22] Filed: Mar. 29, 1996

[51] Int. Cl.⁶ ..................................................... G06K 7/10
[52] U.S. Cl. ........................... 235/472; 235/462; 235/470
[58] Field of Search ................................... 235/462, 472, 235/470, 469, 454, 463

[56] References Cited

U.S. PATENT DOCUMENTS

| | | | |
|---|---|---|---|
| 3,978,317 | 8/1976 | Yamaguchi et al. | 235/462 |
| 4,210,802 | 7/1980 | Sakai . | |
| 4,251,798 | 2/1981 | Swartz et al. | 235/462 |
| 4,409,470 | 10/1983 | Shepard et al. . | |
| 4,734,566 | 3/1988 | Senda et al. . | |
| 4,766,300 | 8/1988 | Chadima Jr. et al. . | |
| 4,835,615 | 5/1989 | Taniguchi et al. . | |
| 4,877,949 | 10/1989 | Danielson et al. . | |

(List continued on next page.)

FOREIGN PATENT DOCUMENTS

| | | | |
|---|---|---|---|
| 60-129891 | 7/1985 | Japan . | |
| 63-67692 | 3/1988 | Japan . | |
| 63-83886 | 4/1988 | Japan . | |
| 63 253 483 | 10/1988 | Japan | 235/462 |
| 60-264383 | 10/1990 | Japan . | |
| 3-198175 | 8/1991 | Japan . | |
| 5-242287 | 9/1993 | Japan . | |
| 6-162247 | 6/1994 | Japan . | |

OTHER PUBLICATIONS

PCT International Search Report dated Sep. 18, 1996 (two pages).
PCT International Search Report date Nov. 7, 1996 (one page).

*Primary Examiner*—Donald T. Hajec
*Assistant Examiner*—Thien Minh Le
*Attorney, Agent, or Firm*—Watts, Hoffman, Fisher & Heinke Co., L.P.A.

[57] ABSTRACT

A portable data collection device. The device includes an imaging assembly including a two dimensional (2D) photosensor array. The imaging assembly is selectively actuatable with a first trigger for reading a target dataform in the imaging assembly's target area and actuatable with a second trigger for capturing a color image of the target object in the target area. The imaging assembly further includes compression circuitry for compressing digital data representative of the target area when the imaging assembly is actuated to capture an image of the target area. The device also includes a viewing assembly to aid an operator in aiming and positioning the device with respect to a target dataform or target object. In one embodiment of the viewing assembly, a liquid crystal display screen is affixed to a pivoting member. When the viewing assembly is actuated an image of the target area is displaced on the display screen. In a second embodiment of the viewing assembly, a manual pivoting member includes an opening. When the pivoting member is positioned a predetermined distance from the operator's eye, a view through the opening corresponds to the imaging assembly's target area.

11 Claims, 15 Drawing Sheets

U.S. PATENT DOCUMENTS

| | | |
|---|---|---|
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr., et al. . |
| 5,200,597 | 4/1993 | Eastman et al. . |
| 5,210,398 | 5/1993 | Metlitsky . |
| 5,235,167 | 8/1993 | Dvorkis et al. . |
| 5,237,365 | 8/1993 | Miyazawa . |
| 5,243,666 | 9/1993 | Hasfeave et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. . |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson . |
| 5,309,243 | 5/1994 | Tsai . |
| 5,314,631 | 5/1994 | Katoh et al. . |
| 5,315,095 | 5/1994 | Maron et al. . |
| 5,319,181 | 6/1994 | Shellhammer et al. . |
| 5,331,143 | 7/1994 | Maron et al. . |
| 5,332,892 | 7/1994 | Li et al. . |
| 5,340,973 | 8/1994 | Knowles et al. . |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Boustaer . |
| 5,359,185 | 10/1994 | Hason . |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,478,997 | 12/1995 | Bridgeall et al. . |
| 5,484,994 | 1/1996 | Routaei . |
| 5,486,688 | 1/1996 | Iima et al. . |
| 5,496,992 | 3/1996 | Madan et al. . |
| 5,504,316 | 4/1996 | Bridgall et al. . |
| 5,559,555 | 9/1996 | Shimzu et al. . |

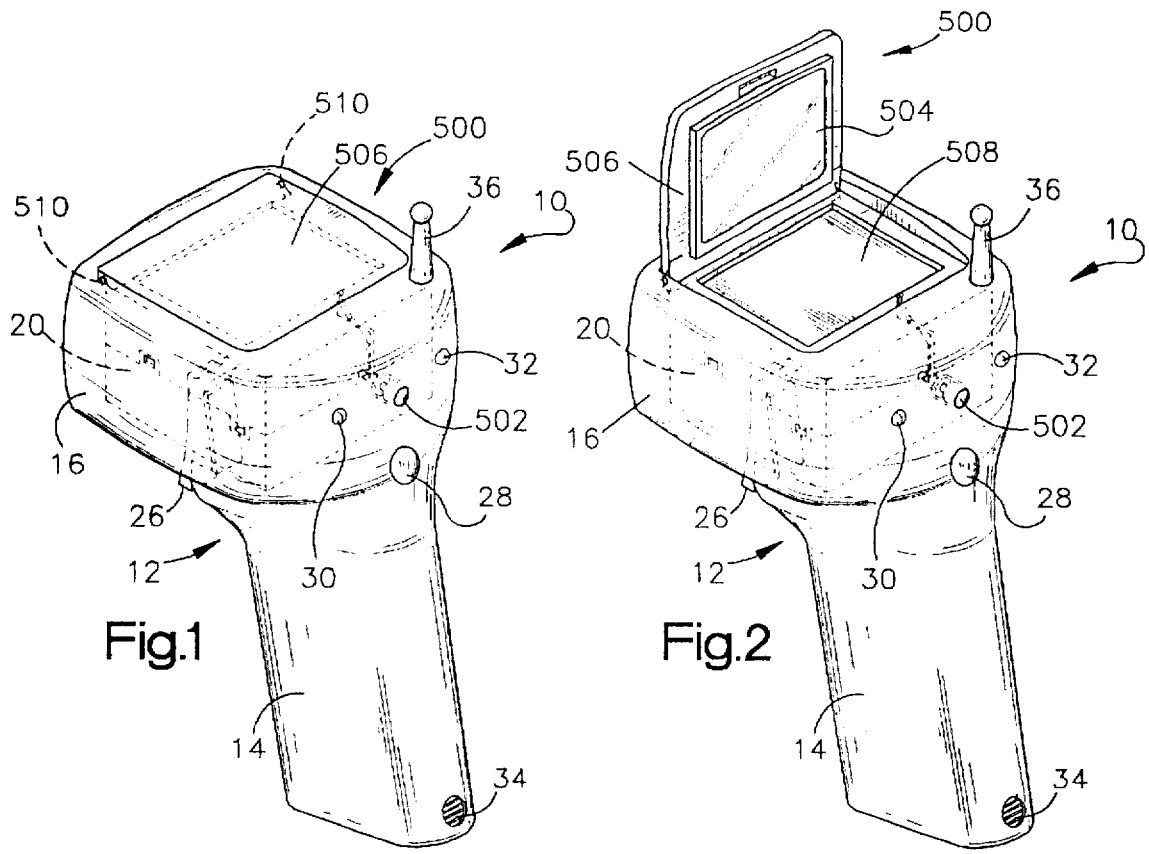
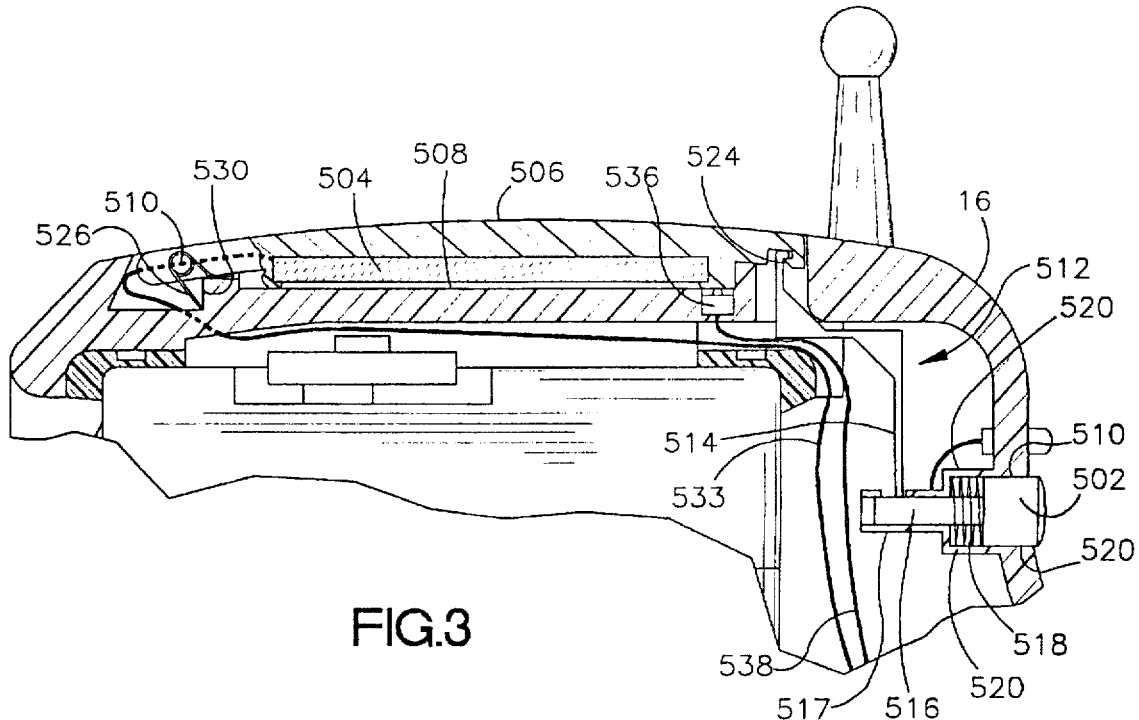

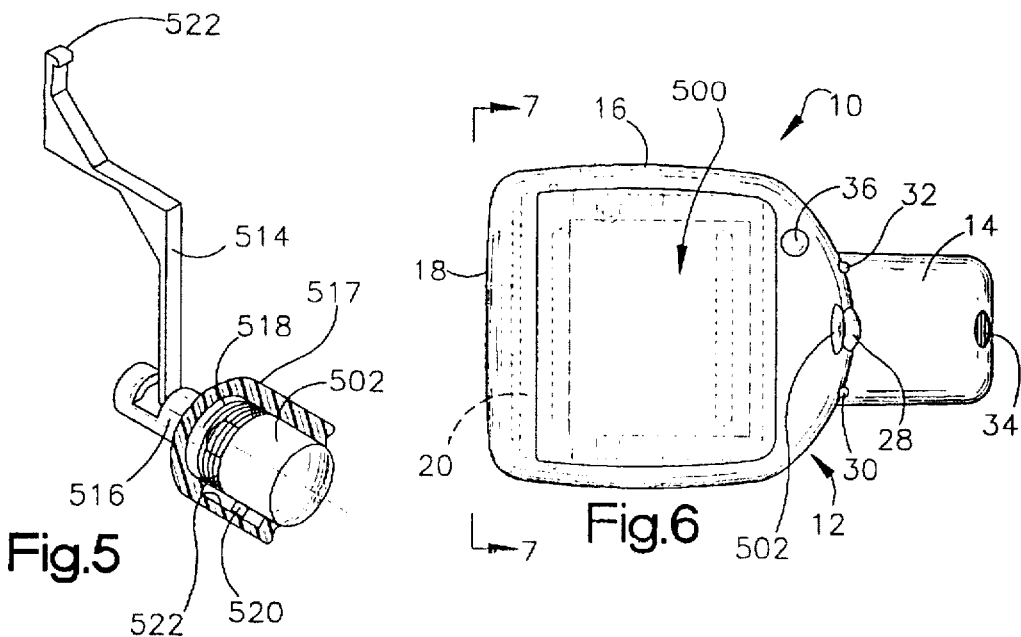
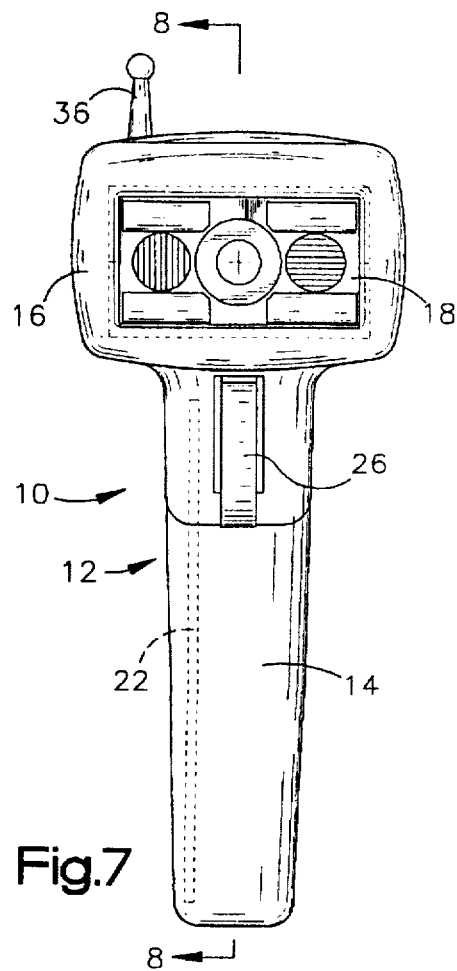

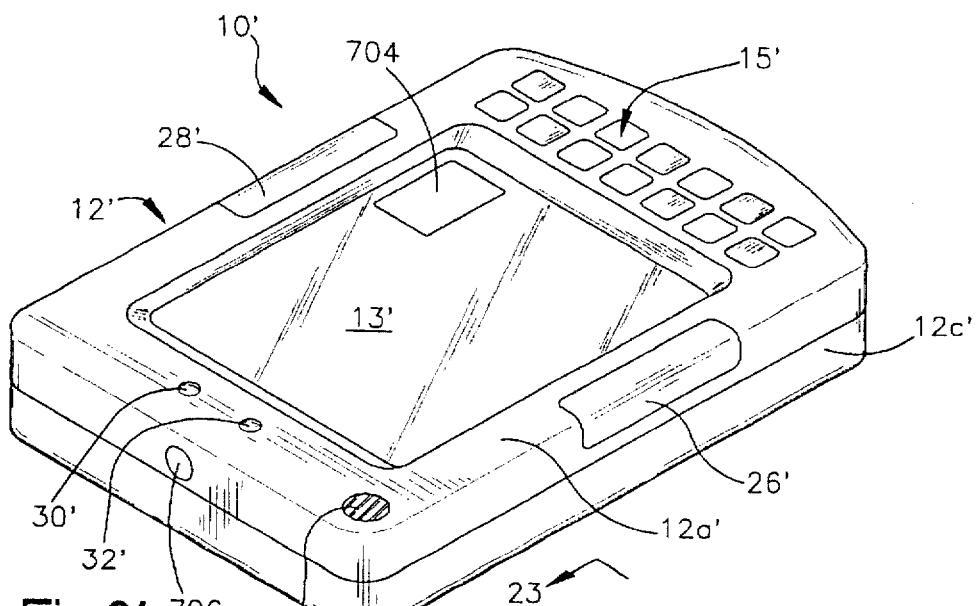
Fig.21
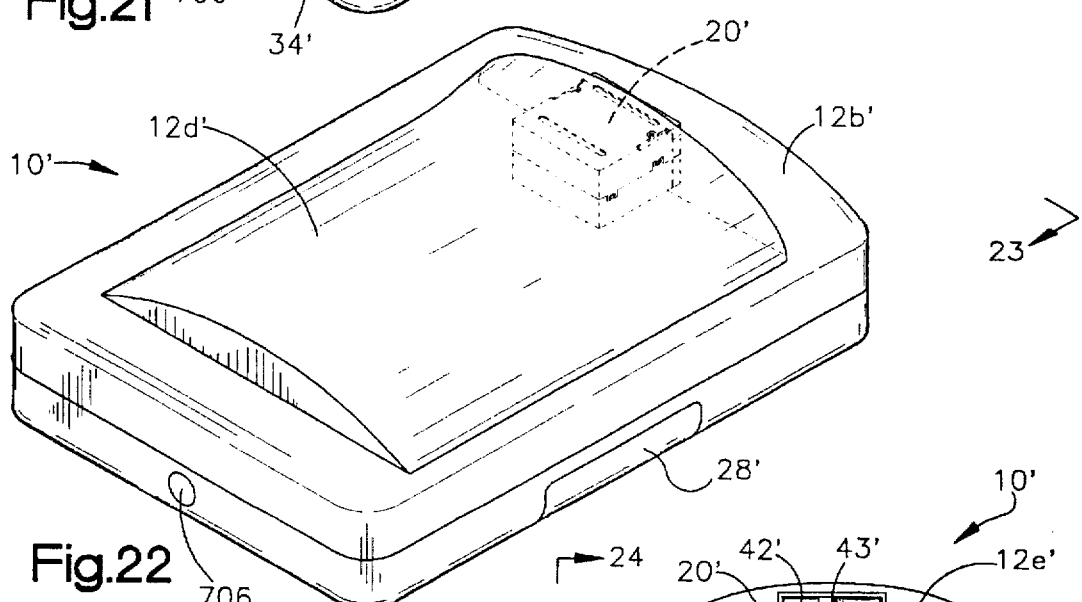
Fig.22
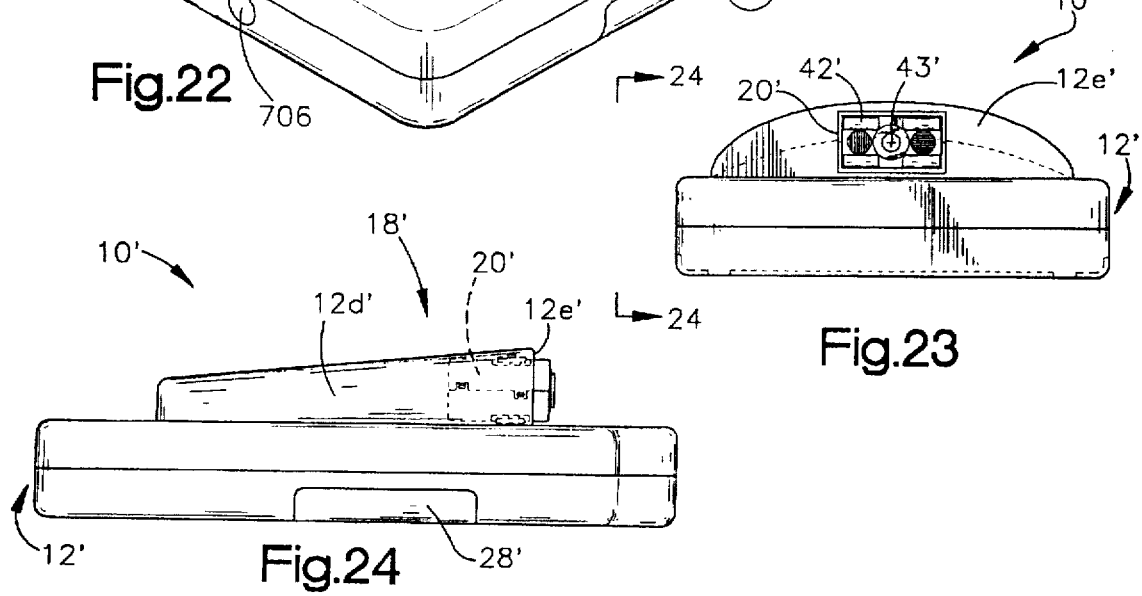
Fig.23
Fig.24

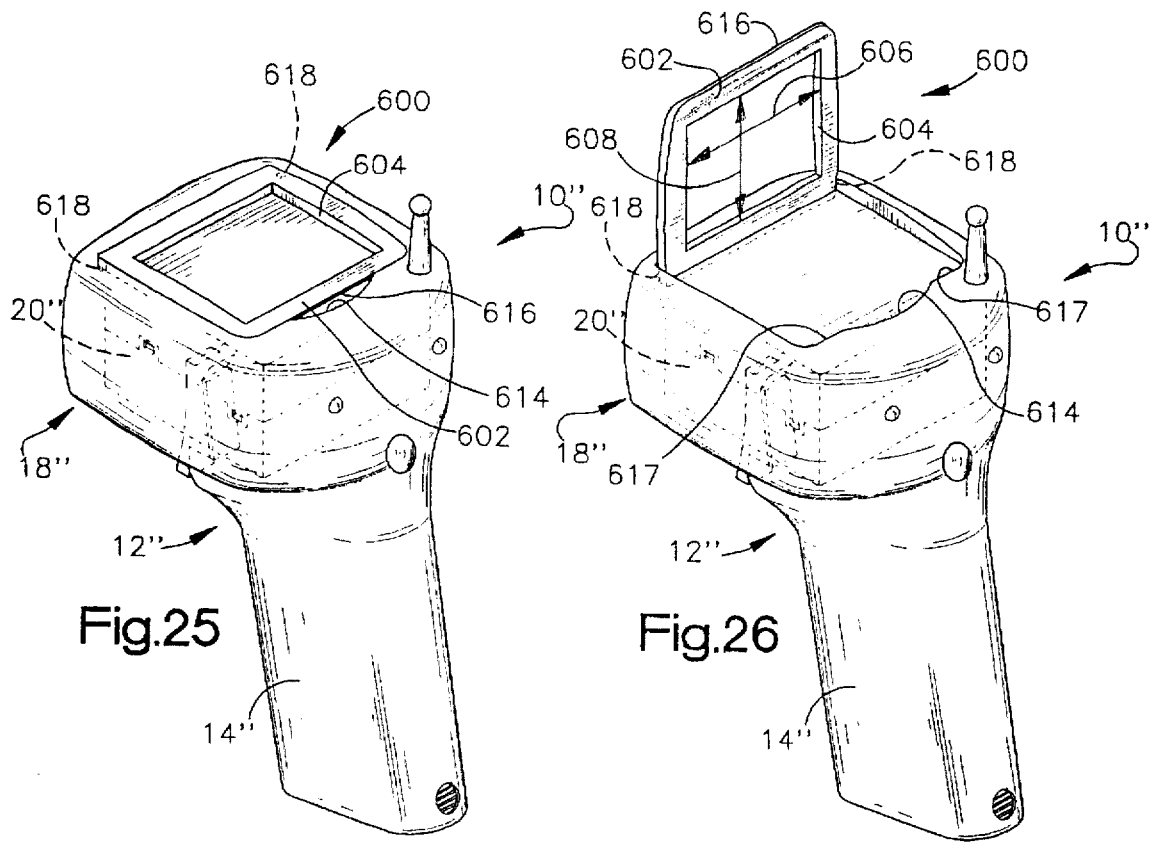
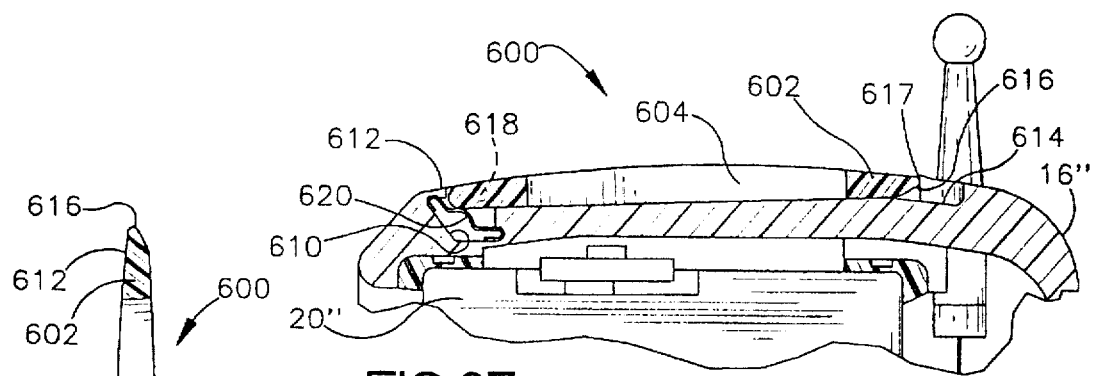
Fig.25   Fig.26   FIG.27
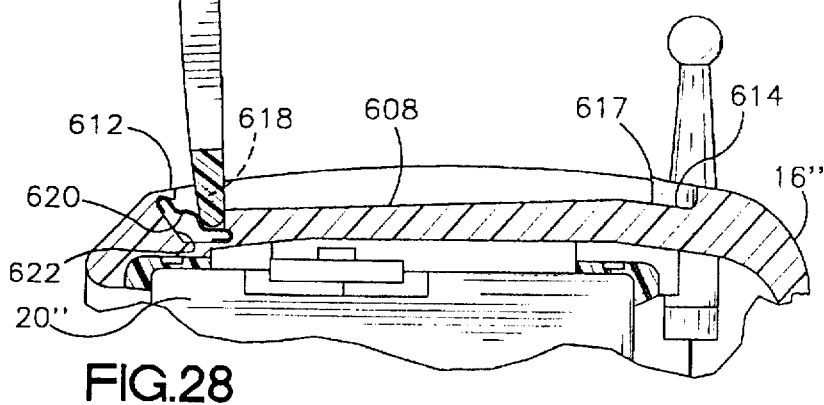
FIG.28

PORTABLE DATA COLLECTION DEVICE WITH VIEWING ASSEMBLY

CROSS REFERENCE TO RELATED APPLICATIONS

This application is a continuation-in-part of copending U.S. application Ser. No. 08/606,619, filed Feb. 26, 1996 entitled "Portable Data Collection Device with LED Targeting and Illumination Assembly" The aforesaid copending application is incorporated herein in its entirety by reference.

FIELD OF THE INVENTION

The present invention relates to a portable data collection device including a two dimensional photosensor array imaging assembly and, more particularly, to a portable data collection device having a two dimensional photosensor array imaging assembly selectively actuatable to read a bar code dataform and record an image of an item of interest and further having a viewing assembly to assist an operator in properly aiming and positioning the device to image a target object.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both of these readers are also capable of reading a "stacked" two dimensional (2D) bar code dataforms such as PDF-417, which has row indicator patterns utilized by the reader for vertical synchronization.

A two dimensional (2D) imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in application Ser. No. 08/544,618, which is assigned to the assignee of the present application, includes an imaging assembly having a two dimensional array of photosensors (also referred throughout as photodiodes or pixels) adapted to read 2D bar code dataforms (e.g., PDF-417, Supercode, etc.) with vertical synchronization row indicator patterns as well as matrix dataforms (e.g., MaxiCode, Data Matrix, Code 1, etc.) which do not include vertical synchronization patterns. The 2D dataform reader disclosed in application Ser. No. 08/544,618 utilizes an open loop feedback control system including fuzzy logic circuitry to determine proper exposure time and gain parameters for a camera assembly application Ser. No. 08,544,618 is incorporated in its entirety herein by reference.

While using a portable data collection device to sequentially read bar code dataforms affixed to products or containers in a production facility, warehouse or retail store, an operator may come upon an item which is damaged, incomplete, mislabeled, in the wrong location, etc. In such a event, it would be desirable for the operator to make a note of the problem item so that appropriate corrective action may be taken by supervisory personnel. However, requiring the operator to make a handwritten notation on a clipboard or input information concerning the item using a keyboard or keypad of the portable data collection device is both time consuming and error prone.

What is needed is a portable data collection device having a 2D imaging assembly that can be actuated to read bar code dataforms by depressing a trigger and, when a problem item is found, the imaging assembly can be actuated with a separate trigger to record an image of the problem item. This would enable "information", that is, an image of the problem item, to be recorded without seriously interrupting the normal course of the operator's work. Additionally, it would be desirable to transmit the recorded image of the problem item to appropriate supervisory personnel so that appropriate corrective action may be taken. In certain instances, it may be sufficient to record a single frame of the image of a problem item, while in other cases, for example, if the item is larger than a field of view or target area of the imaging assembly, it may be necessary to record a continuous video image of the problem item to permit the operator to record a complete view of the item. It would also be desirable to provide an audio capture module to simultaneously capture the operator's voice, enabling the operator to provide further identification and/or commentary on the problem item to aid supervisory personnel in locating the item and taking appropriate corrective action.

Additionally, what is needed is a portable data collection device including an illumination assembly and a viewing assembly to assist the operator in properly aiming and positioning the portable data collection device with respect to a target object such that the target object is within a target area of the imaging assembly. A size of a target area of the imaging assembly is defined by a field of view of the imaging assembly and a distance between the imaging assembly and the target object. The target object may be a dataform to be read or an item to be imaged.

Advantageously, an illumination assembly would emit targeting illumination to aid an operator in aiming the device at a target object while a viewing assembly would permit the operator to visualize the target area and the target object. Visualizing the target area of the image assembly would facilitate proper alignment of the target area and the target object thus insuring that the device is properly aimed. Further, visualizing the imaging target area and the target object would aid the operator in positioning the device relative to the target object such that the target object is encompassed within an outer perimeter of the target area.

Furthermore, in package delivery applications, upon delivery of a package, the delivery person typically uses a portable data collection device to read a bar code dataform affixed to the delivered package. Normally, the delivery person also obtains a signature of the person receiving the package. Typically, the signature of the person receiving the package is on a sheet of paper that must be filed with the package delivery records or on a signature capture digitizer pad so that the signature may electronically filed.

What is needed is a portable data collection device having a 2D imaging assembly that can be actuated to read a bar code dataform by depressing one trigger and can be actuated by a separate trigger, or applications software, to record an image of a signature of a person receiving a package so that the signature can be filed electronically.

As an alternative to using one trigger to read a bar code dataform and using the second trigger to image an adjacent signature block with a recipient's signature included therein a single trigger could be used to decode a dataform and capture an image of the recipient's signature. the dataform could be encoded if the signature block is at a predetermined position with respect to the dataform, a signal image may include both the dataform and the signature block. What is needed is a portable data collection device that can be actuated by a single trigger to capture an image of a bar code dataform and an adjacent signature block, decode the bar code dataform, determine the position of the signature block, and output a compressed digitized representation of the portion of the image comprising the signature block for subsequent downloading to a remote device.

SUMMARY OF THE INVENTION

In accordance with this invention, a portable data collection device is provided that includes a two dimensional (2D) photosensor array imaging assembly selectively actuatable for reading bar code dataforms (bar code dataform reading mode) and recording an image of an item in the imaging assembly's target area (imaging mode). A size of the target area is dependent on a field of view of the imaging assembly and a distance between the imaging assembly and a target object, the object being either a dataform to be read or an item to be imaged. The portable data collection device includes two trigger switches, a first trigger actuatable for reading a bar code dataform and a second trigger actuatable for recording an image of an item in the target area. In a radio embodiment of the portable data collection device of the present invention, a radio module is provided for transmitting an output signal to a remote device. In a batch embodiment of the portable data collection device of the present invention, an output signal is coupled to a terminal processing board for further processing and storage.

The imaging assembly of the portable data collection device of the present invention further includes control and selection circuitry which receives input signals from a user of the portable data collection device and determines and formats an appropriate output signal. The output signal may include data from a decoded dataform imaged in a captured image frame, a compressed representation of a captured image, an uncompressed representation of a captured image, or a combination of these. If the desired output signal is decoded dataform data, the selection circuitry will utilize image processing and decoding circuitry to decode the dataform.

Alternately, if the desired output signal is to represent an image of a field of view of a camera assembly of the imaging assembly, the selection circuitry may output the entire frame of image data from the buffer memory or, if appropriate, invoke a compression module to compress the image to reduce the quantity of data to be transmitted by a radio module of the portable data collection device to a remote device or to be output to a terminal processing board of the portable data collection device.

As discussed, the portable data collection device of the present invention includes two manually activated trigger switches for controlling the selection circuitry to select between a imaging capture mode and a dataform decoding mode. A first trigger switch, the dataform decoding trigger, institutes the dataform decoding mode and signals the selection circuitry to output a decoded representation of a dataform in a captured image frame. The second trigger switch, the imaging trigger, institutes the imaging mode and has two operating embodiments. In the first operating embodiment of the imaging mode, depressing the imaging trigger results in the imaging assembly capturing one frame of the field of view or target area of the camera assembly. In the second operating embodiment of the imaging mode, depressing the imaging trigger results in the imaging assembly continuously capturing successive frames as long as the trigger is depressed.

In a third operating embodiment of the portable data collection device of the present invention, activation of the dataform reading trigger will result in both decoded data and at least a portion of the captured image frame being output. This embodiment would advantageously be employed in a situation where a o dataform is associated with, for example, a signature block in proximity to the dataform wherein the dataform includes encoded data setting forth the position of the signature block with respect to some predetermined location on the dataform. When the dataform decoding trigger is actuated, an image of the dataform and associated signature block is captured. The dataform is decoded and the decoded data is analyzed by the selection circuitry to determine the location of the signature block. The output signal includes both the decoded data and an image of the signature block.

Advantageously, the portable data collection device of the present invention includes a voice capture module which captures and digitizes sound received through a microphone mounted on the device during actuation of the second trigger. This feature enables an operator to "attach" a verbal message to the captured image. The digitized signal representing the captured sound portion is processed by a voice compression module prior to output to the radio module or the terminal processing board.

The imaging assembly includes a board camera assembly having a photosensor array assembly including a two dimensional (2D) array of photosensors or pixels and a control and decoder board. The control and decoder board includes decoding circuitry, image compression circuitry, control and selection circuitry, serial output circuitry, exposure parameter control circuitry and image buffering circuitry including signal processing circuitry and a frame buffer memory. The signal processing circuitry includes synchronization extractor circuitry and analog to digital (A/D) converter circuitry for converting a composite video signal generated by the board camera assembly to digital image data. The decoding circuitry includes a decoder for decoding 1D and 2D bar code dataforms. The exposure parameter control circuitry includes fuzzy logic control circuitry for controlling the frame exposure period and gain adjustment of the board camera assembly.

The imaging assembly further includes an illumination assembly for illuminating a target item in the imaging assembly target area and an optic assembly for focusing reflected light from the target area upon the 2D array of photosensors of the photosensor array assembly.

The optic assembly includes a plurality of lenses positioned to the front of the 2D photosensor array for focusing reflected light from the target area onto the photosensor array. A shroud supports the optic assembly and shrouds ambient illumination from the photosensor array. The board camera assembly includes the 2D photosensor array, exposure period control circuitry and gain control circuitry mounted on a printed circuit board. The illumination assembly includes an array of LED illuminators for uniformly illuminating the target area and two targeting LED illuminators for generating a cross hair illumination intensity pattern for aiming the portable data collection device appropriately.

The device further includes a viewing assembly to further aid in aiming and positioning the portable data collection device with respect to a target object. In one embodiment of the viewing assembly, the assembly includes a liquid crystal display screen supported on a pivoting member. Upon depressing a viewing assembly push button trigger, a latching mechanism releases the pivoting member which is biased to pop up into an upright position in a line of vision of the operator and a viewing switch is tripped causing the display screen to be energized. Display driver circuitry coupled to a frame buffer memory extracts successive captured image frames from memory and causes an image of the target area of the imaging assembly to be displayed on the display screen. To prevent accidental capture of image data, the viewing switch may also be used to enable the imaging trigger, that is, the imaging trigger is disabled unless the viewing assembly is operational.

The image of the target area displayed on the display screen facilitates both aiming the device at the target object and positioning the device at a distance from the target object such that the target object is encompassed within the target area of the imaging assembly. When the operator does not want to use the viewing assembly, the pivoting member is folded down where it is out of the operator's line of vision and out of harm's way. As the pivoting member is folded down, the viewing switch is tripped again causing the display screen and the display driver circuitry to be deenergized to save energy. The latching mechanism maintains the pivoting support in the folded down position until the viewing assembly trigger is again depressed.

In an alternate embodiment of the viewing assembly, a pivoting member is manually pivotable into an upright position in a line of vision of the operator. The pivoting member defines an aperture. The operator holds the device at a fixed distance with respect to his or her viewing eye and looks through the aperture to view the target object. The aperture is sized such that when an operator viewing eye is approximately 56 millimeters (mm.) from the pivoting member, a view seen through the aperture is substantially equivalent to the target area of the imaging assembly. Thus, the operator may advantageously use the aperture both for properly aiming the device at the target object and for moving the device closer to or further away from the target object so that the target object is large as possible but still is imaged within a perimeter of the target area. When the operator does not desire to use the viewing assembly, the pivoting member is folded down out of the operator's line of vision and out of harm's way.

In a first housing embodiment of the portable data collection device of the present invention, the device includes pistol-grip shaped housing enclosing circuitry of the device. An angled snout extending from a grip portion of the housing includes an opening through which a portion of the illumination assembly and optic assembly extend. A finger operated trigger is provided on a target facing surface of the housing. The trigger is depressed by an operator to actuate the imaging assembly to read a bar code dataform in the target area. A push button actuator extends through an opening of the housing spaced apart from the trigger. The push button actuator is located so as to be depressible by the operator's thumb as the housing is cradled in the operator's hand. Depressing the push button actuator actuates the imaging assembly to capture an image of the target area.

The viewing assembly push button trigger also extends through an opening in the housing. The pivoting member of the viewing assembly is hingedly secured to an upper portion of the angled snout. In a folded down position, the pivoting member fits within a recess in an upper portion of the angled snout. When the viewing assembly trigger is depressed, the pivoting member pops up to an upright position and a liquid crystal display screen affixed to an operator facing side of the pivoting member is energized to display an image of the imaging assembly's target area.

In a second housing embodiment of the portable data collection device of the present invention, a thin rectangular shaped housing supports a workslate computer. The workslate computer includes an interactive display screen and a keypad supported by a top surface of the housing. The housing defines an interior region which encloses circuitry of the device. A side surface of the housing includes an opening through which a portion of the illumination assembly and optic assembly extend. Two push button actuators are provided on opposite sides of the display screen. One actuator actuates the imaging assembly to read a bar code dataform in the target area, while the other actuator actuates the imaging assembly to capture an image of the target area. A third push button actuator is also provided on one side of the display screen to actuate a viewing assembly. When the viewing assembly is actuated a portion of the interactive display screen displays an image of the imaging assembly's target area. Other systems for activating the viewing assembly are also envisioned.

The aforementioned and other aspects of the present invention are described in more detail in the detailed description and accompanying drawings which follow.

BRIEF DESCRIPTION OF THE DRAWINGS

FIG. 1 is a perspective view of a first embodiment of a portable data collection device of the present invention with a pivoting member of a viewing assembly in a folded down position;

FIG. 2 is a perspective view of the portable data collection device of FIG. 1 with the viewing assembly pivoting member in an upright position.

FIG. 3 is a sectional view of a portion of a housing of the portable data collection device of FIG. 1 and the viewing assembly pivoting member;

FIG. 5 is a perspective view of a latching mechanism of the viewing assembly of FIG. 1;

FIG. 6 is a top view of the portable data collection device of FIG. 1;

FIG. 7 is a front elevation view of the portable data collection device of FIG. 1 as seen from a plane indicated by the line 7—7 in FIG. 6;

FIG. 21 is a perspective view of a top side of a second housing embodiment of a portable data collection device of the present invention;

FIG. 22 is another perspective view of a bottom side of the portable data collection device of FIG. 21;

FIG. 23 is a side elevation view of the right side of the portable data collection device of FIG. 21 as seen from a plane indicated by the line 23—23 in FIG. 22;

FIG. 24 is a side elevation view of the left side of the portable data collection device of FIG. 21 as seen from a plane indicated by the line 24—24 in FIG. 23;

FIG. 25 is a is a perspective view of a second embodiment of a portable data collection device of the present invention with a pivoting member of a viewing assembly in a folded down position;

FIG. 26 is a perspective view of the portable data collection device of FIG. 25 with the viewing assembly pivoting member in an upright position;

FIG. 27 is a sectional view of a portion of a housing of the portable data collection device of FIG. 25 and the viewing assembly pivoting member in the folded down position;

FIG. 28 is a sectional view of the portion of the housing of FIG. 27 with the viewing assembly pivoting member in the upright position;

DETAILED DESCRIPTION

Figure 4:
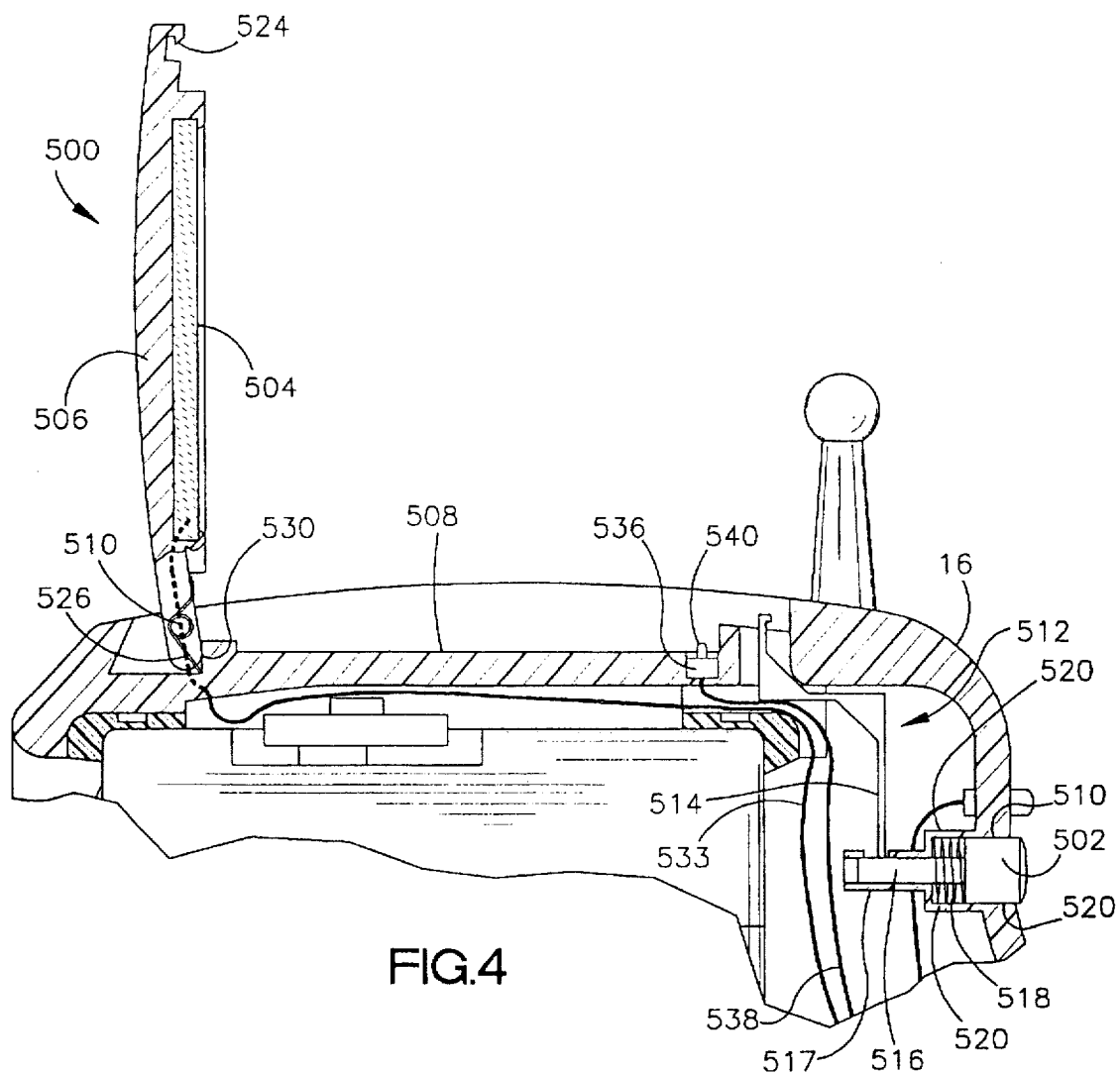
FIG. 4 is a sectional view of a latching assembly of the viewing assembly of FIG. 1.

Turning to the drawings, a portable data collection device in accordance with the present invention is shown at 10 in FIGS. 1–8. The data collection device 10 includes a housing 12 defining an interior region. The housing 12 includes a gripping portion 14 sized to be grasped in the hand of an operator and an angled snout 16 extending from the gripping portion. With specific reference to FIG. 8, the snout 16 includes an opening through which a portion of a two dimensional (2D) photosensor array imaging assembly 18 extends. The imaging assembly 18 includes a modular portion 20 and a control and decoder board 22 electrically coupled to the electronic circuitry in the modular portion. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through an opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand. Also extending through an opening in the housing 12 just above the imaging trigger 28 is a push button trigger 502 positioned to be depressed by the operator's thumb. Depressing the trigger 502 causes a viewing assembly 500 (to be discussed below) to be actuated.

The gripping portion 14 also includes two small openings through which a distal portion of a red light emitting diode (LED) indicator 30 and a distal portion of a green LED indicator 32 extend. Finally, the housing 12 includes an opening exposing a portion of a microphone 34 mounted in the housing interior region and another opening through which a radio antenna 36 extends. The interior region of the housing 12 supports the imaging assembly 18 and other electronic circuitry to be described below.

Figure 9:
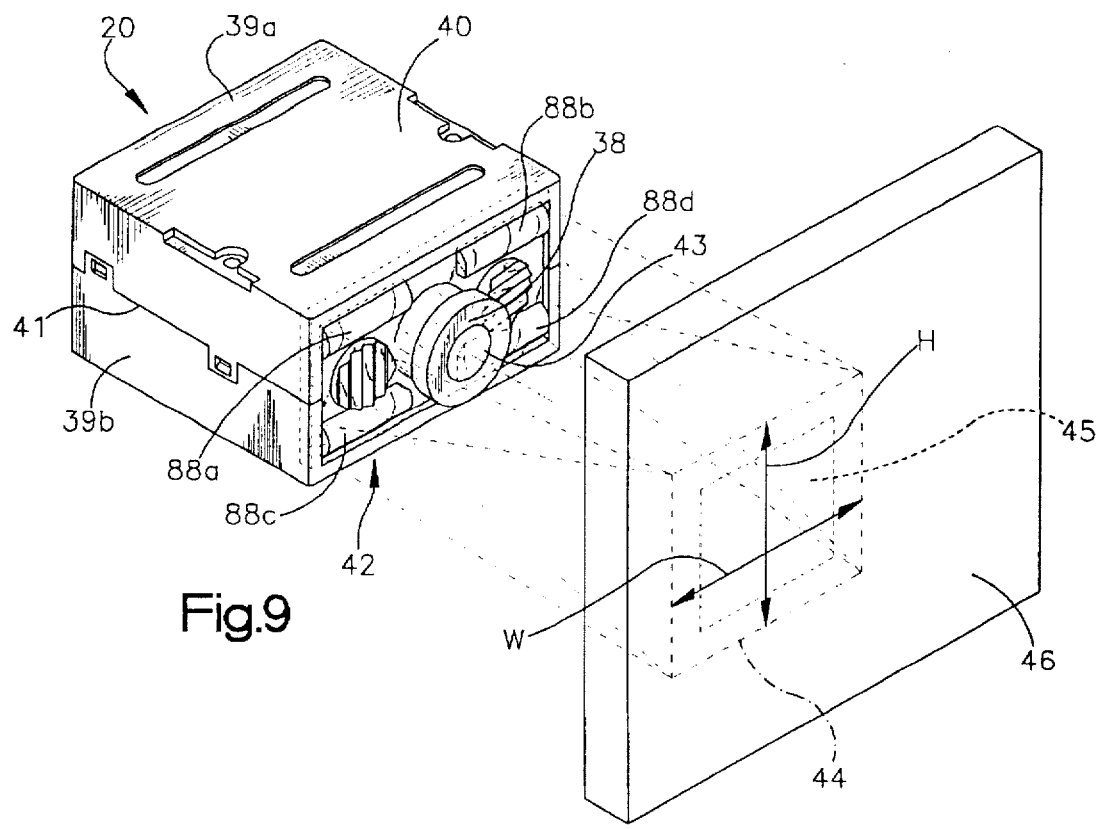
FIG. 9 is a perspective view of a modular portion of an imaging assembly of the portable data collection device of the present invention, the modular portion shown imaging a target dataform on an item.

Referring to FIG. 9, which shows a perspective view of the modular portion 20 of the imaging assembly 18, it can be seen that the modular portion includes a housing 40 which supports an illumination assembly 42 and a board camera assembly 38. The housing 40 includes an upper portion 39a and a lower portion 39b which advantageously are identically shaped and positioned symmetrically about a part line 41. The board camera assembly 38 includes an optic assembly 43 which focuses an image of a target area 44 onto a photosensor array 48 (discussed later). The target area is defined by a field of view of the board camera assembly 38. The illumination assembly 42 includes four illumination optic portions 88a, 88b, 88c, 88d each of which projects an even intensity distribution of illumination across the target area 44.

Figure 10:
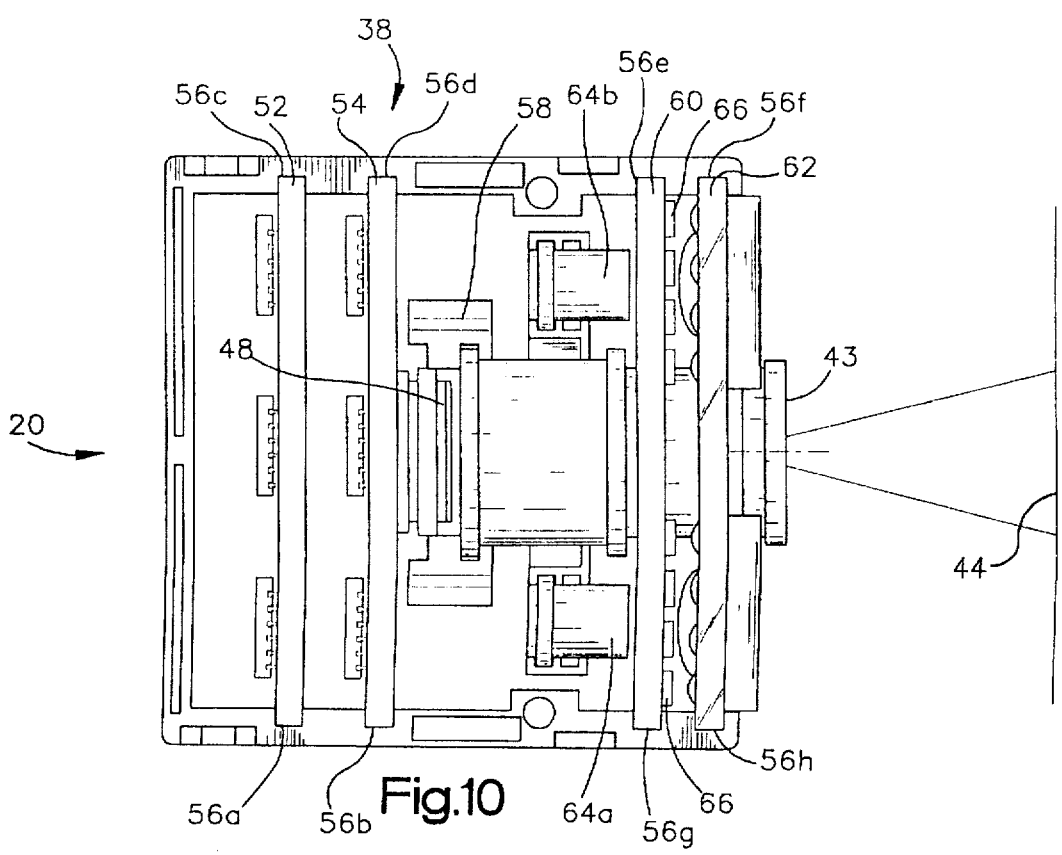
FIG. 10 is a view of the modular portion of the imaging assembly of FIG. 9 with an upper half of the housing removed.

FIG. 10 is a top view of the modular portion 20 with the upper portion 39a of the housing 40 removed. The board camera assembly 38 includes a rear printed circuit board 52 and a front printed circuit board 54, both of which are secured in the housing 40 in slots 56a, 56b, 56c, 56d. A two dimensional photosensor array 48 is positioned on the front surface of the front printed circuit board 54 and receives reflected illumination from the target area 44 focused through an optic assembly 43. A shroud 58 positions the optic assembly 43 with respect to the photosensor array 48 and shrouds ambient illumination from the array. The illumination assembly 42 includes a printed circuit board 60, a lens array 62 and two targeting LEDs 64a, 64b. A plurality of exposure LEDs 66 are disposed on the front surface of printed circuit board 60 to direct illumination through the lens array 62 towards the target area 44. The circuit board 60 and the lens array 62 are secured in slots 56e, 56f, 56g, 56h in the upper and lower housing portion 39a, 39b. Securing the board camera assembly 38 and the illumination assembly 42 in the same housing 40 assures that illumination is properly directed onto the target area 44.

Figure 15:
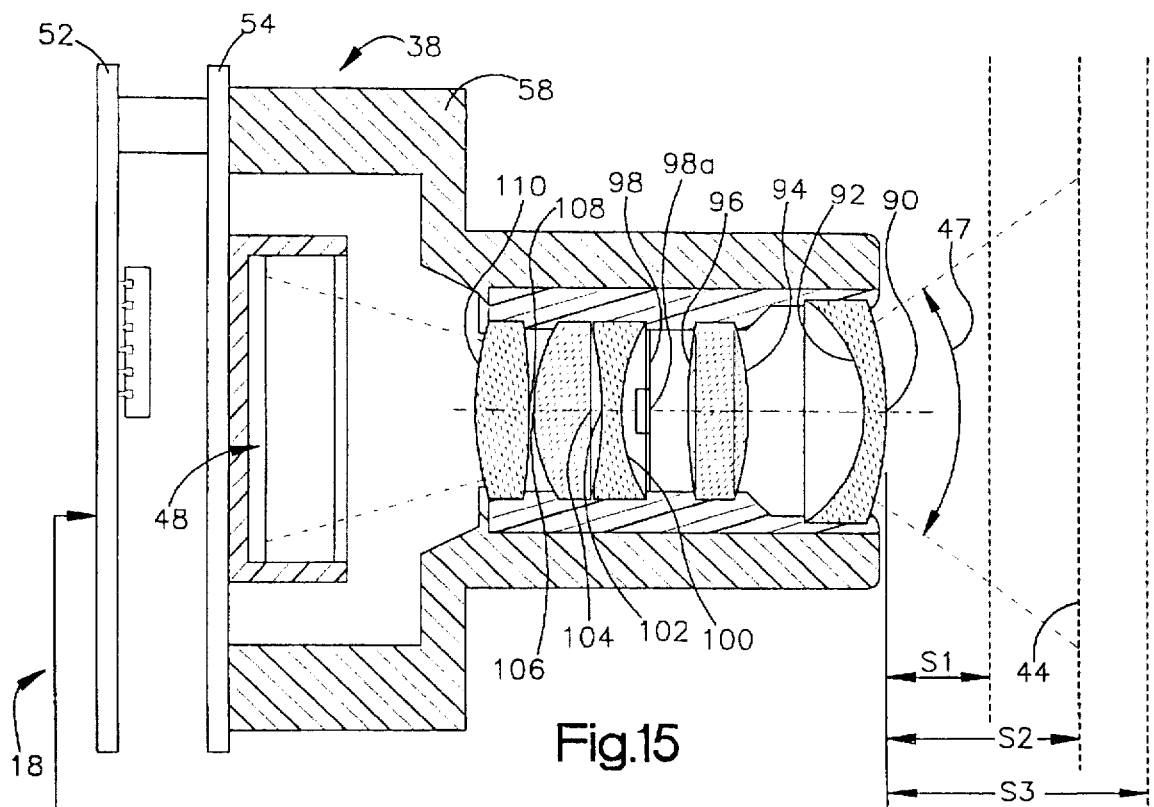
FIG. 15 is a sectional view of an optic assembly of the modular portion of the imaging assembly of FIG. 9.

FIG. 15 shows a cross section of the camera assembly 38 with the optic assembly 43 focusing an image of the target area 44 onto the photosensor array 48. The performance of the portable data collection device 10 is enhanced by the optic assembly 43 which provides the board camera assembly 38 with an extended working range. Based on the distance between the optic assembly 43 and the photosensor array 48, there exists a best focus position S2 in front of the forward-most surface 90 of the optic assembly 43 at which an image of an object in the target area 44 will be focused sharpest on the photosensor array 49. The image sharpness gradually degrades as the object is moved towards a near field cut off distance S1 and a far field cut off distance S3. The optic assembly 43 has an angular field of view 47 which is wide enough to image large dataforms at the far field S3 and still provide a large image of a small dataform at the near field S1. In the preferred embodiment, the portable data collection device 10 has a working range from about 2.5 inches to at least 12 inches (for 15 mill bar code (minimum bar width 0.015")) from a front surface 90 of the optic assembly 43 with the best focus distance S2 being about 5.5 inches (approximately 140 mm) from the front surface 90. The preferred field of view corresponds to a target area or surface 5 inches long by 3.75 inches high at a distance of 8.5 inches from the front surface 90.

The preferred optic assembly 43 includes 5 lenses and a metal disk 98 having a pin hole aperture 98a which, as shown, includes eleven optical surfaces labeled 90–110. In the preferred embodiment the rear most optic surface 110 is positioned 10.2 mm. to the front of the photosensor array 49. As noted before, the best focus position 52 is at 140 mm. to the front of the front optic surface 90.

The optic prescriptions for each of the optic surfaces are as follows:

| Optic Surface | Radius of Surface Curvature | Diameter | Shape |
|---|---|---|---|
| 90 | R = 13.52 mm | D = 8.8 mm | convex |
| 92 | R = 5.3 mm | D = 8.8 mm | concave |
| 94 | R = 12.47 mm | D = 7 mm | convex |
| 96 | R = 19.9 mm | D = 7 mm | convex |
| 98 | Pinhole diameter 0.81 mm | | |
| 100 | R = 6.76 mm | D = 7 mm | concave |
| 102 | R = 12.47 mm | D = 7 mm | concave |
| 104 | R = 158.52 mm | D = 7 mm | convex |
| 106 | R = 6.76 mm | D = 7 mm | convex |
| 108 | R = 28.08 mm | D = 7 mm | convex |
| 110 | R = 11.26 mm | D = 7 mm | convex |

The distance between successive optical surfaces 90–110 is as follows:

| Optic Surface | Distance |
|---|---|
| 90–92 | .77 mm |
| 92–94 | 4.632 mm |
| 94–96 | 2.32 mm |
| 96–98 | 1.798 mm |
| 98–100 | .805 mm |
| 100–102 | 0.77 mm |
| 102–104 | 0.327 mm |
| 104–106 | 2.34 mm |
| 106–108 | 0.178 mm |
| 108–110 | 2.07 mm |

Such an optic assembly is available from Marshall Electronics, Inc. of Culver City, Calif.

An alternate optic assembly which includes a compact aspheric plastic doublette design can be found in U.S. patent application Ser. No. 08/494,435, filed Jun. 26, 1995, entitled "Extended Working Range Dataform Reader", application Ser. No. 08/494,435 is assigned to the same assignee as the assignee of the present invention and is incorporated in its entirety herein by reference.

Because the desired working range and field of view of the portable data collection device 10 dictates that the optic assembly 43 have a large F# (F#5.6 or greater), the illumination assembly 42 must provide adequate illumination of the target area 44 during the exposure period so that enough reflected light is absorbed by the photosensor array 48 to generate a suitably bright image. However, the exposure period is normally limited to 0.01 seconds or less to minimize the smear effect of an operator's hand jittering during a dataform reading session. Therefore, the illumination assembly 42 must provide adequate illumination to accommodate the large F# and short exposure time.

Proper exposure of the photosensor array 48 requires an object field illumination of 0.3 lux assuming an exposure period of 0.03 seconds and an F#1.2. To determine the proper object field illumination for a 0.01 second exposure period and an F#13, the following formula is used:

$$\frac{(\text{Illumination intensity}) (\text{Exposure period})}{(F\#)^2} = \text{Constant}$$

Therefore, the minimum required object field illumination for this invention is 106 lux at the far field cut off distance S3.

Figure 11:
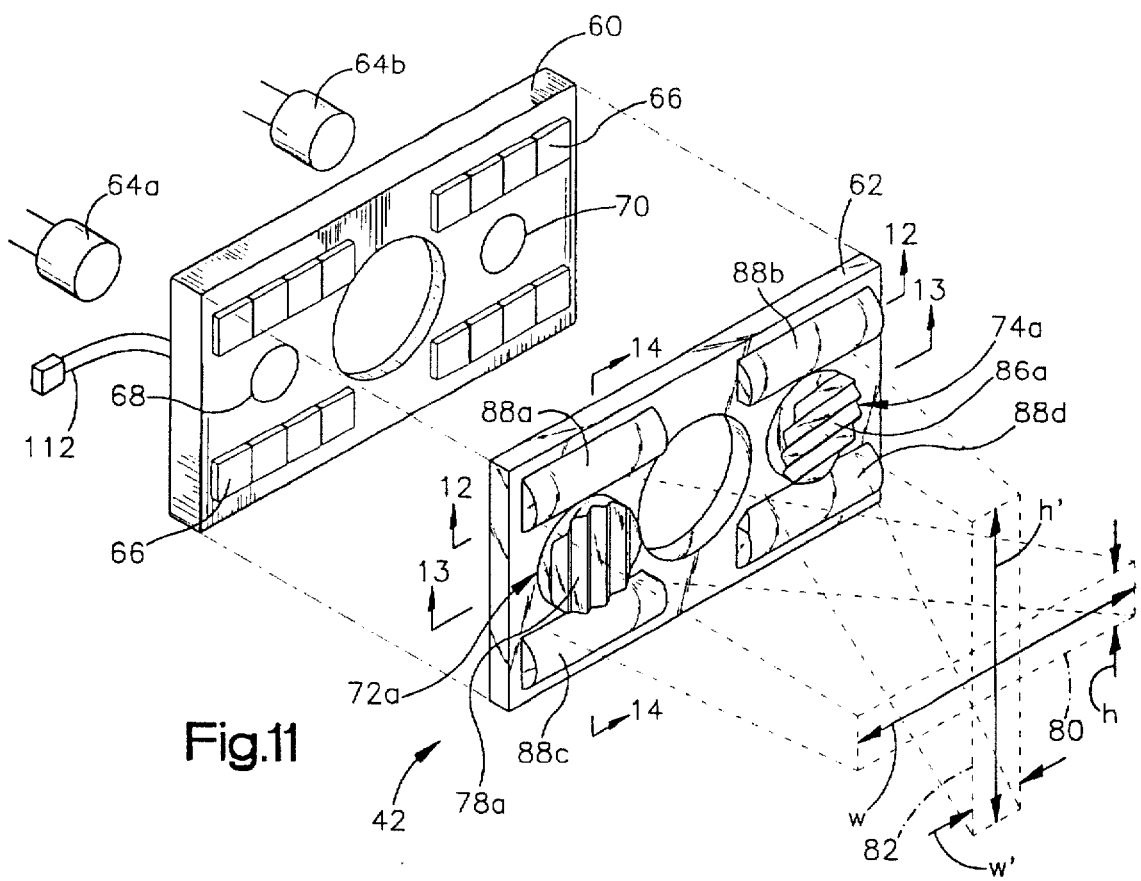
FIG. 11 is an exploded perspective view of an illumination assembly of the modular portion of the imaging assembly of FIG. 9.

Referring to FIG. 11, which is an exploded perspective view of the illumination assembly 42, the printed circuit board assembly 60 includes a plurality of surface mount exposure illumination LEDs 66. An acrylic or polycarbonate lens array 62 is positioned between the printed circuit board assembly 60 and the target area 44 for directing the illumination from the exposure LEDs 66 towards the target area 44. The printed circuit board assembly 60 includes printed conductors and a power lead 112 operative for supplying power to the illumination LEDs 66. A suitable surface mount illumination LED is produced by the MarkTech Corporation of Latham, N.Y., as Part No. MTSM735K-UR or MTSM745KA-UR. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totaling sixteen illumination LEDs providing 4560 mcd of uniform illumination over the target area 44. The lens array 62 includes four illumination optic portions 88a, 88b, 88c, 88d each of which are aligned with a corresponding bank of illumination LEDs 66. The illumination optic portions 88a, 88b, 88c, 88d direct a 68 degree angular illumination field from each illumination LED 66 into a uniform field having an angular field of view which substantially corresponds to the angular field of view of the optic assembly 43 which defines the target area 44 (shown in FIG. 9).

Figure 12:
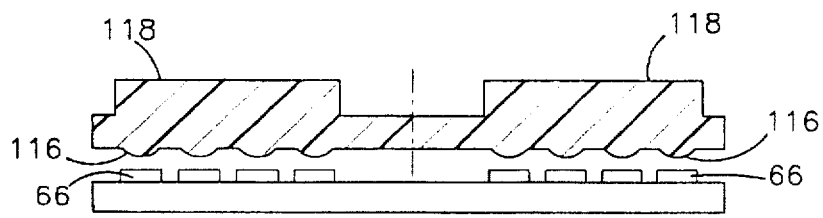
FIG. 12 is a sectional view of the front panel of the illumination assembly of FIG. 11 as seen from a plane indicated by the line 12—12 in FIG. 11.
Figure 14:
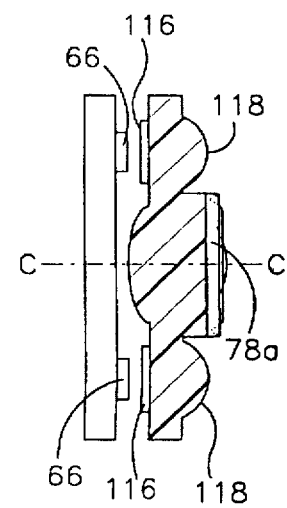
FIG. 14 is a sectional view of the front panel of the illumination assembly of FIG. 11 as seen from a plane indicated by the line 14—14 in FIG. 11.

Referring to FIGS. 12 and 14, which show a horizontal cross section (FIG. 12) and a vertical cross section (FIG. 14) through the illumination optic portions 88a, 88b, 88c, 88d, it can be seen that each optic portion includes four vertically oriented cylindrical entry surfaces 116, one positioned in front of each LED 66 and a horizontally oriented cylindrical exit surface 118 positioned in front of each bank of LEDs 66. The vertically oriented cylindrical entry surfaces 116 define the horizontal field of illumination and the horizontally oriented cylinders 118 define the vertical field of illumination. This arrangement provides an even illumination intensity distribution across the target area 44. The 4560 mcd of illumination provided by the illumination LEDs 66 will provide an illumination intensity in excess of 106 lux at the far field cut off distance S3 of 8.5 inches.

Referring again to FIG. 11, the illumination assembly also includes a targeting arrangement including the targeting illuminators 64a, 64b, which, when energized, project illumination through apertures 68, 70 in the printed circuit board and into first and second targeting optics 72a, 74a respectively of the lens array 62. The first targeting optics 72a, shown in cross section in FIG. 13 and 14 includes a lens with an aspherical light entry surface 76a and a horizontal periodic light exit surface 78a.

The aspherical entry surface 76a has a radius of 8 mm., a thickness of 1.81 mm., a radius of curvature of 3.132 mm and a conic constant of −2.3354 to colliminate or pencil the illumination from the targeting LED 64a. The shape of the horizontal periodic exit surface 78a is a cosine waveform function across the horizontal dimension (best seen in FIG. 13). The cosine waveform function is uniform, that is, no discontinuities. Additionally, the cosine waveform function is a first order function, that is, it has a constant amplitude and frequency across the entire exit surface 78a. The equation of the cosine waveform function is of the form Y=cos x. As can be seen in FIG. 14, the horizontal periodic exit surface 78a does not have any optic curvature in the vertical dimension.

Referring to FIG. 11 again, the aspherical entry surface 76a and the horizontal periodic exit surface 78a interact to generate an illumination intensity distribution pattern that appears to be a thin horizontally oriented rectangle 80 with a narrow height h and a width w approximately equal to the width W of the target area 44 (FIG. 9). As can best be seen in FIG. 13, the horizontal periodic exit surface 78a is tipped or tilted at an angle c with respect to a longitudinal axis L—L through the lens array 62 and, therefore, is also tilted at an angle c with respect to the target area 44. The tip angle c of the horizontal periodic exit surface 78a shifts the horizontal position of the illumination rectangle 80 such that it is horizontally centered in the target area 44. The value of the tip angle c is best determined through modeling and measuring the performance of a chosen cosine function of the periodic exit surface 78a. A suitable tip angle c for the present embodiment would be approximately 4°, a value which is empirically determined.

It should be appreciated that the horizontal periodic exit surface 78a determines the width w of the illumination rectangle 80 or, more particularly, the intensity distribution of illumination across the width w of the rectangle 80. The period, amplitude and continuity of the periodic function determine the uniformity of the intensity distribution of the illumination. A non uniform periodic function will create hot spots (areas of intense illumination) and dead spots (areas of low illumination). Further, a cosine function having a higher amplitude or shorter period would increase the width of the rectangle 80 as compared to a cosine function with a longer period and lower amplitude.

Figure 30:
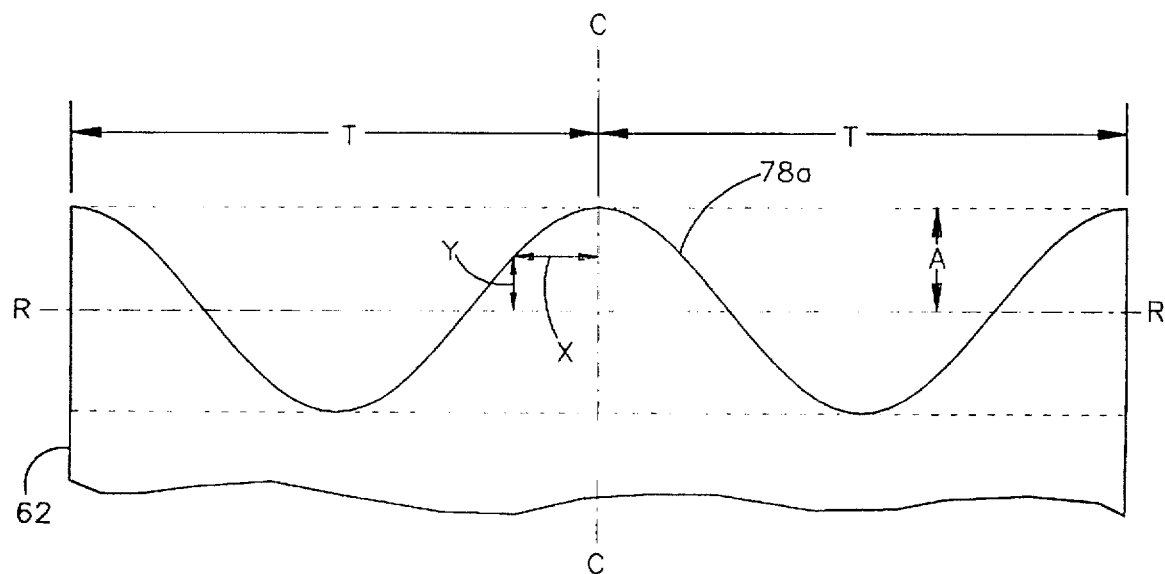
FIG. 30 is a schematic diagram of a portion of a targeting optics horizontal periodic exit surface of a lens array of an illumination assembly of the present invention.

FIG. 30 represents an end view of a middle portion of the horizontal periodic exit surface 78a. For simplicity of discussion, the tip angle c of the surface 78c is not illustrated in FIG. 30, instead the exit surface 78a is assumed to be not inclined. A line labeled C—C (also seen in FIG. 14) represents a center of the horizontal periodic exit surface 78a. A vertical displacement or height y of any point on the horizontal periodic exit surface 78a with respect to a horizontal center line R—R (the midpoint between the "peaks" of the surface 78a) through the surface is given by the following equation:

$$Y = A \cos(2\pi f x)$$

where:

Y=surface displacement from center line R—R (mm.)

A=amplitude of the exit surface displacement (mm.)

x=distance from the center C—C of periodic exit surface 78a f=frequency of exit surface cosine function (cycles/mm.)

Note that a distance corresponding to one period, which is labeled T in FIG. 30 may be used to calculate the frequency f via the following equation:

$$f = 1/T$$

where: T=period of cosine function of exit surface 78a (mm.)

For the illumination rectangle 80 to have a width w of 109 mm. at a distance of 190 mm. from the horizontal periodic exit surface 78a, the required value of A and f are: A=0.025 mm. and f=2.5 cycles/mm.

Figure 13:
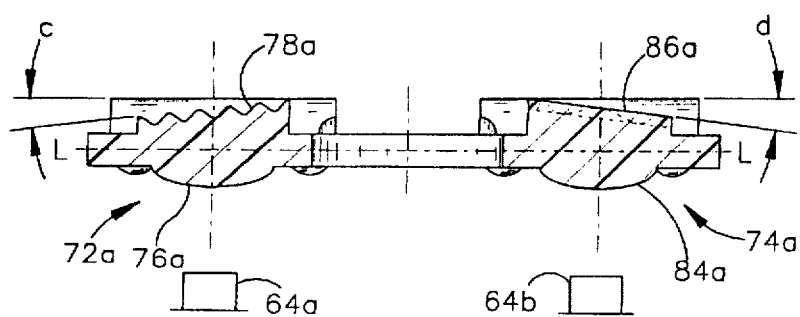
FIG. 13 is a sectional view of the front panel of the illumination assembly of FIG. 11 as seen from a plane indicated by the line 13—13 in FIG. 11.

In FIG. 13 it can be seen that the second targeting optics 74a includes a lens having an aspherical light entry surface 84a and a vertical periodic light exit surface 86a. Again, as with the aspheric entry surface 76a, the aspheric entry surface 84a has a diameter of 8 mm, a thickness of 1.81 mm, a radius of curvature of 3.132 mm. and a conic constant of −2.3354 and is configured to colliminate or pencil the illumination generated by the targeting LED 64b. A shape of the vertical periodic exit surface 86a is a uniform, first order cosine waveform function across the vertical dimension. The vertical periodic exit surface 86a does not have any optic curvature in the horizontal dimension.

Referring to FIG. 11 again, the aspherical entry surface 84a and the vertical periodic exit surface 86a interact to generate an illumination intensity distribution pattern that appears to be a thin vertical oriented rectangle 81 with a narrow width w' and a height h' approximately equal to the height H (FIG. 9) of the target area. As can best be seen in FIG. 13, the vertical periodic exit surface 78a is tipped or tilted at an angle d with respect to a longitudinal axis L—L through the lens array 62 and, therefore, is also tilted at an angle d with respect to the target area 44. The tip angle d (FIG. 13) of the vertical periodic exit surface 86a shifts the vertical position of the illumination rectangle 81 so that it is vertically centered in the target area 44. The value of d is best determined through modeling and measuring the performance of a chosen cosine function of the periodic exit surface 86a. An acceptable value for the tip angle d for the present embodiment is 6.17°.

The vertical periodic exit surface 86a determines the height h' of the illumination rectangle 81, and more particularly, the illumination intensity distribution over the height of the illumination rectangle 81. The periodic surface function set forth above with respect to the horizontal periodic exit surface 78a is applicable to the vertical periodic surface 86a, except that the horizontal and vertical coordinates would have to be switched appropriately as follows:

$$X = A \cos(2\pi f y)$$

where:

x=surface displacement from a center line

A=amplitude of the exit surface displacement (mm.)

y=distance from the center C—C of periodic exit surface 86a (mm.)

f=frequency of periodic exit surface cosine function (cycles/mm.)

For the illumination rectangle 80 to have a width w' of 109 mm. at a distance of 190 mm. from the vertical periodic exit surface 78a, the required value of A and f are: A=0.025 mm. and f=2.0 cycles/mm.

While a simple cosine function is suitable for the shape of the horizontal and vertical periodic exit surfaces 78a, 86a, it should be appreciated that a higher order cosine function, determined through modeling and measuring the performance of the optics 72a, 74a could be used to optimize the horizontal and vertical intensity distribution patterns.

Figure 8:
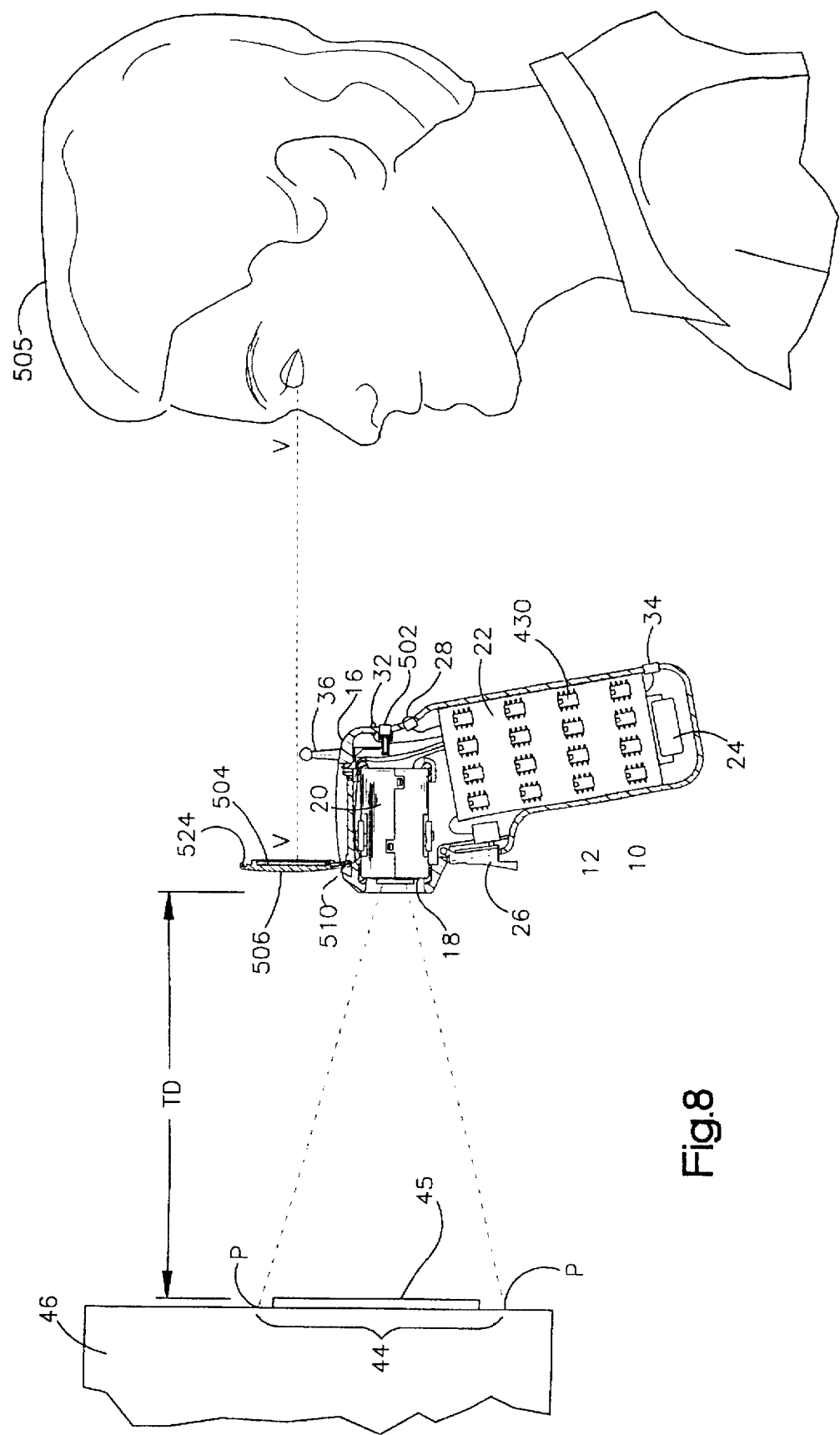
FIG. 8 is a sectional view of the portable data collection device of FIG. 1 as seen from a plane indicated by the line 8—8 in FIG. 7.

Referring again to FIGS. 1–4, the portable data collection device 10 also includes the viewing assembly 500 which, when actuated by depressing the viewing assembly push button trigger 502, displays an image of the target area 44 of the imaging assembly on a liquid crystal display screen 504 which is affixed to a pivoting member 506. Depressing the trigger 502 also causes the pivoting member 506 to pop up from its folded down position (FIGS. 1 and 3) to an upright position (FIGS. 2 and 4). As can be seen in FIG. 8, when the pivoting member 506 is in the upright position, the display screen 504 is in a line of vision V—V of the operator 505 in aiming the device 10 at the target object 45, e.g., a dataform to be decoded.

An image (not shown) displayed on the display screen 504 when the viewing assembly 500 is actuated substantially corresponds to the target area 44 imaged by the imaging assembly 18. Displaying an image of the target area 44 on the display screen 504 aids the operator in both aiming the device 10 at the target object 45 and in positioning the device at a proper distance, labeled TD from the target object such that the image of the target object is as large as possible but does not extend beyond an outer boundary or perimeter, labeled P of the target area 44.

The pivoting member 506 and the attached display screen 504 fit into a recess 508 in an upper surface of the snout 16 of the housing 12 such that, in the folded down position, the pivoting member is out of harm's way and is substantially flush with a remainder of the upper surface of the snout 16. The pivoting member 506 pivots on cylindrical end portions 510 (best seen in FIG. 4) which extend from a side of the pivoting member. The cylindrical end portions 510 are pivotably supported within a pair of cylindrical openings in the snout 16. Looped around each cylindrical end portion 510 is a biasing spring 526 to bias the pivoting member 506 to the upright position. Each biasing spring 526 is contained between the pivoting member 506 and the snout 16, that is, one end of each biasing spring 526 contacts a bottom side of the pivoting member and the other end of each biasing spring contacts a corner of a recessed portion of the snout in which an end portion of the pivoting member pivots.

While the biasing springs 526 biases the pivoting member to the upright or open position, the pivoting member 506 is latched in the folded down position by a latching mechanism 512 including a latching member 514 and a plunger 516 coupled to the trigger 502. As can best be seen in FIGS. 4 and 5, the trigger 502 is biased to an outward or undepressed position by another biasing spring 518 which is looped around a portion of the plunger 516 and is contained between the trigger and an inwardly extending portion 517 of the housing 12 which functions to support and guide the trigger and the plunger. The trigger 502 includes outwardly extending wings 520 (one of which can be seen in FIG. 5) which are constrained within travel path slots 522 (one of which can be seen in FIG. 5) defined by the housing inwardly extending portion 517. The wings 520 and travel path slots 522 coact to define a limited linear path of travel for the trigger 502, the plunger 516 and the latching member 514 as the trigger is depressed by the operator 505 to actuate the viewing assembly 500.

In the folded down position of the pivoting member 506, an extending horizontal latching lip 522 (best seen in FIG. 5) of the latching member 514 engages a hook shaped extending latch receiving portion 524 (best seen in FIG. 4) of the pivoting member 506 to hold the pivoting member in the folded down position. When the trigger 502 is depressed, the lip 522 disengages the latch receiving portion 524 the biasing springs 526 pop the pivoting member 506 into the upright position (FIG. 4). The edge 530 of the snout recessed portion prevents the pivoting member 506 from pivoting beyond the upright position.

Depressing the trigger 502 permits the pivoting member 506 to move to the upright position and simultaneously causes the image of the target area 44 to be displayed on the display screen 504. As can be seen in FIGS. 3 and 4, a switch 536 mounted in the snout recessed area 508 is electrically coupled to the control and decoder board 22 via a lead 538. The display screen 504 is electrically coupled to the control and decoder board via a lead 533. When the pivoting member 506 is in the folded down position, a plunger 540 of the switch 536 is depressed and the display screen 504 and associated display driver circuitry 534 (schematically shown in FIG. 17A) are deenergized by the control and decoder board 22 to save power. When the trigger 502 is depressed, the pivoting member 506 pops up as does the plunger 540. When the plunger 540 pops up, it sends a signal to the control and decoder board 22 causing the control and decoder board to energize the display screen 504 and the display driver circuitry 534. The display driver circuitry 534 in conjunction with the microprocessor 266 cause the image of the target area to be displayed on the display screen 504. The display screen 504 continues to display the image until the pivoting member 506 is returned to its folded down position and the plunger 540 is depressed sending another signal to the control and decoder board to deenergize the display driver circuitry 534 and the display screen 504. As an alternative embodiment, to prevent accidental image capture, the plunger 540 can be used to enable and disable imaging trigger 28. In such an embodiment, the imaging trigger 28 will only be active when the plunger 540 is released, that is, the pivoting member 506 is upright.

Figure 17A:
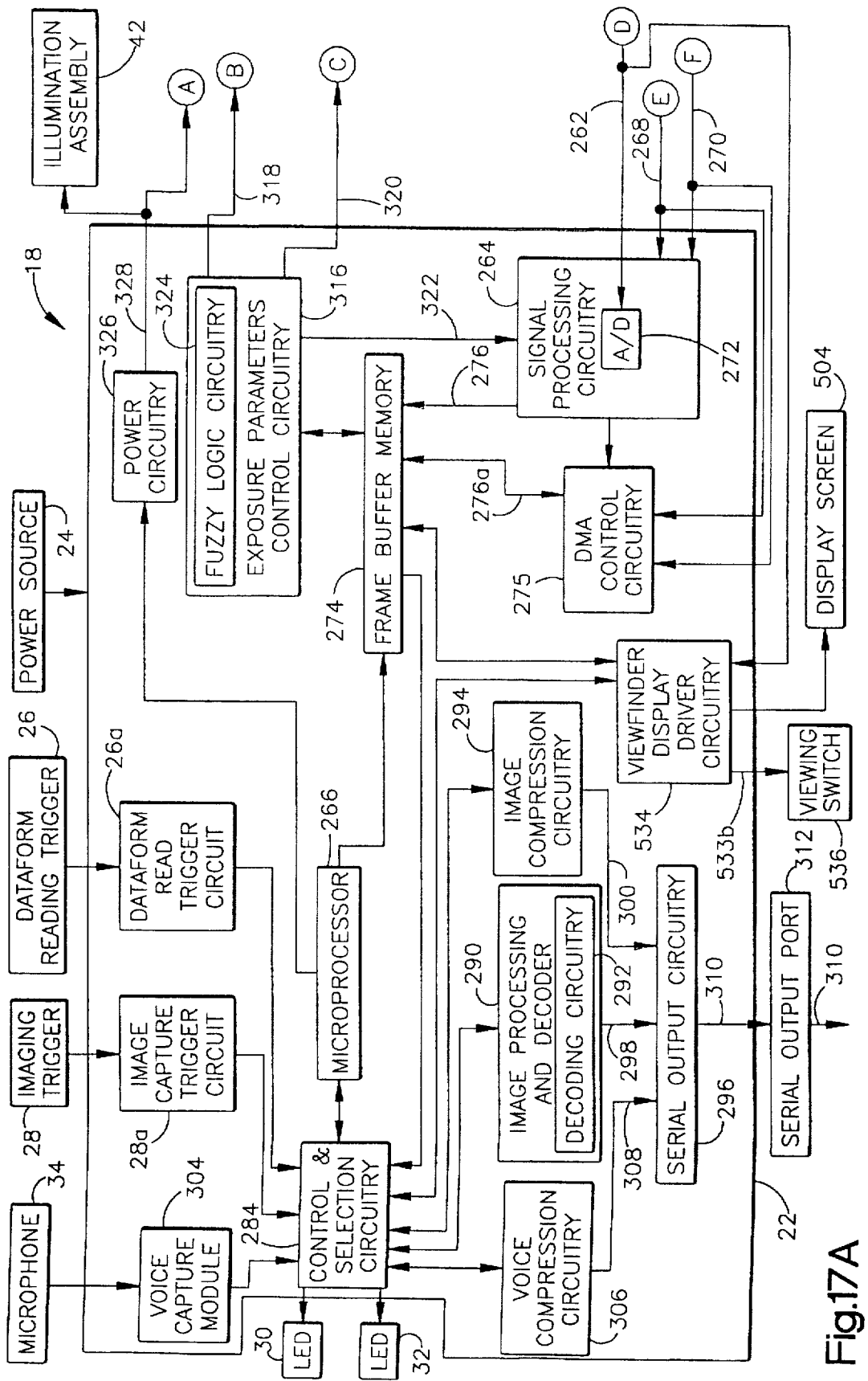
FIG. 17A is one portion of a block diagram of selected circuitry of the portable data collection device of the present invention.
Figure 17B:
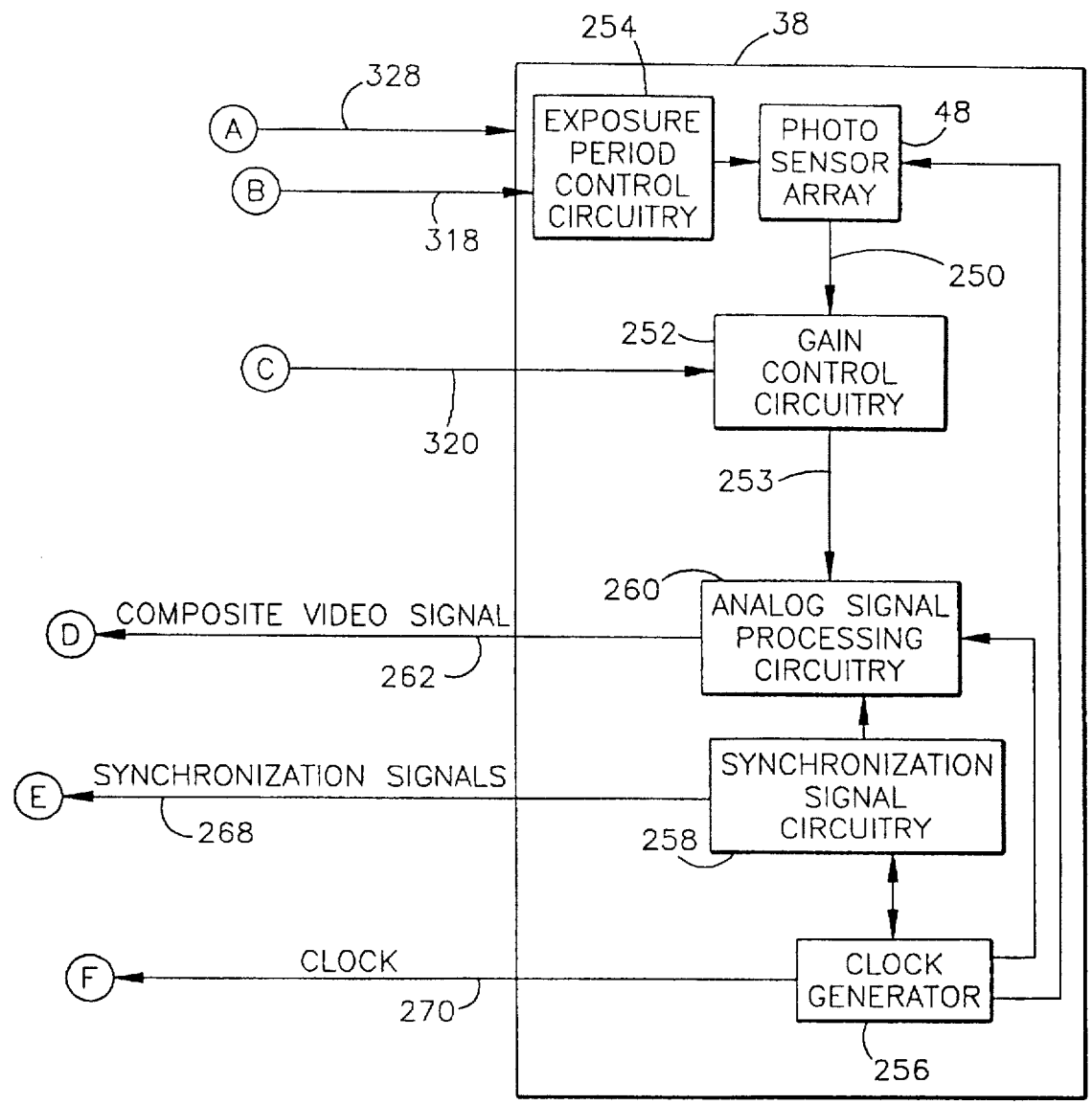
FIG. 17B is a second portion of a block diagram of selected circuitry of the portable data collection device of the present invention, the second portion matching the first portion shown in FIG. 17A.

In the preferred embodiment of the portable data collection device of the present invention, the photosensor array 48 is part of the board camera assembly 38 commercially available from such vendors as Sharp or Sony of Japan. Referring to FIGS. 17A and 17B, the camera assembly, when activated, generates a composite video signal 262. The board camera assembly 38 also includes a clock generator 256, synchronization signal circuitry 258 and analog signal processing circuitry 260 for reading illumination intensity values out of each photosensor of the photosensor array 48 and generating the composite video signal 262.

The intensity of light incident on individual pixels or photosensors of the photosensor array 48 varies somewhat uniformly from very bright (whitest areas of the image) to very dark (darkest areas of the image). The preferred 2D photosensor array 48 comprises an interlaced 752 by 582 matrix array of photodiode photosensors or image pixels (for a total of 437,664 pixels). The clock generator 256 coupled to a crystal oscillator and generates asynchronous clocking signals to read out charges accumulating on individual photosensors over an exposure period. The charges on the photosensors are read out through CCD elements adjacent the photosensor array photosensors. The charges are converted to a voltage signal 250 wherein temporal portions of the voltage signal represent the changes accumulated on each photosensor. One CCD element is provided for reading out the charges on two photosensors thus two read outs of the photosensor array comprise one full image frame, the frame being comprised of two interlaced fields.

The camera assembly 38 generates the composite analog video signal 262 (FIG. 17A) corresponding to consecutive fields of the image incident on the photosensor array 48. The video signal 262 is termed "composite" because it includes synchronization signals generated by the synchronization signal circuitry 258 which correlate portions of the video signal to particular photosensors, interspersed among image signal portions wherein the signal magnitude represents charges on individual photosensors read out from a given row of the photosensor array 48.

The board camera assembly 38 also includes gain control circuitry 252 for controlling amplification of the image signal 253 and exposure period control circuitry 254 for controlling a duration of an exposure period of the pixels. Both the exposure period control circuitry 254 and the gain control circuitry 252 are controlled by fuzzy logic exposure parameter control circuitry discussed with reference to FIG. 17A.

The synchronization signals 268 generated by synchronization signal circuitry 258, the clock signal 270, generated by the clock generator 256, and the composite video signal 253 are output to signal processing circuitry 264 on the control and decoder board 22. Because the signal processing circuitry is configured to receive a composite video signal, it should be appreciated that selection of the board camera assembly 38 and its accompanying components for generating the composite video signal are not critical to the present invention.

Under the control of a microprocessor 266 mounted on the control and decoder board 22, the video signal 262 is input to the signal processing circuitry 264 along with clocking signals 268 and synchronization signals 270. The signal processing circuitry 264 includes synchronization extractor circuitry which receives 5 the clocking signals 268 and the synchronization signals 270 and generates signals which are coupled to analog to digital converter circuitry (A/D converter circuitry) 272 causing the A/D converter circuitry to periodically digitize the video signal 262. The A/D converter circuitry 272 includes an A/D converter generating an 8 bit value representing the illumination incident on a pixel of the array.

Direct memory access (DMA) control circuitry 275 receives the synchronization signals 270 and clock signals 268 and generates address signals 276a coupled to the frame buffer memory 274 to indicate a storage location for each value generated by the A/D converter circuitry 272.

Data signals 276 representing the values generated by the A/D converter circuitry 272 are coupled to the frame buffer memory 274.

Control and selection circuitry 284 mounted on the control and decoder board 22 and coupled to the frame buffer memory 274 receives successive image frames temporarily stored in the frame buffer memory 274. Also coupled to the control and selection circuitry 284 are the dataform read trigger circuit 26a which, in turn, is coupled to the dataform reading trigger 26 and an image capture trigger circuit 28a which, in turn, is coupled to the imaging trigger 28.

When an operator institutes a dataform reading session (dataform reading mode) by depressing the dataform reading trigger 26, the dataform read trigger circuit 26a sends a signal to the control and selection circuitry 284 causing the control and selection circuitry to couple a captured frame from the frame buffer memory 274 to image processing and decoder circuitry 290.

The image processing and decoding circuitry 290 includes a decoder 292 for decoding 1D and 2D dataforms in the target area 44. The image processing and decoder circuitry 290 operates on the stored frame of image data to extract dataform cell data (determine the black or white value of each cell of the dataform) and decode the cell data. Cell extraction is done in accordance with U.S. patent application Ser. No. 08/543,122 entitled, "Sub Pixel Dataform Reader With Dynamic Noise Margins", filed Oct. 13, 1995 and assigned to the assignee of the present invention. The contents of application Ser. No. 08/543,122 is hereby incorporated by reference. Decoding of the cell data is accomplished by known decoding methods for each particular dataform format.

Also coupled to the control and selection circuitry 284 is image compression circuitry 294 and serial output circuitry 296. The control and selection circuitry 284 routes data 298 representing a decoded dataform data directly from the decoding circuitry 292 to the serial output circuitry 296. The decoded dataform data 298 is not compressed prior to output to the serial output circuitry 296. There is a possibility of error in the compression and subsequent decompression process and losing even a portion of a decoded dataform data may result in adverse consequences such as subsequent errors in updating inventory, determining the status or tracking an item, etc. Thus, the decoded dataform data 298 is not compressed.

When an operator institutes an imaging session (imaging mode) by depressing the imaging trigger 28, the image capture trigger circuit 28a sends a signal to the control and selection circuitry 284 causing the selection circuitry to couple a captured frame from the frame buffer memory 274 to image compression circuitry 294 to be compressed before being output to the serial output circuitry 296 or directly to the serial output circuitry 296 without being compressed.

Generally, the control and selection circuitry 284 will be programmed to route the data representing a captured image frame to the image compression circuitry 294 because the occurrence of one or more errors in the data representing an image is normally not a significant problem. That is, an image of an item in the target area 44 will still be recognizable and useful to supervisory personnel viewing the image reconstructed from the captured image frame data even if there is some slight distortion of the image. After compression of the image data by the image compression circuitry 294, compressed image data 300 is routed to the serial output circuitry 296. If, however, a high resolution image is needed, the control and selection circuitry 284 may be appropriately programmed to route the data representing the captured frame directly to the serial output circuitry 296.

The image compression circuitry 294 utilizes an image compression algorithm to reduce the size of a set of digital image data. One such algorithm is the 2D wavelet transform compression algorithm as described in "A 64 Kb/s Video Code Using the 2D Wavelet Transform" by A. S. Lewis and G. Knowles, published in IEEE Computer Society Press, Order No. 2202. The HARC Wavelet Transform System utilizing such technology is available from Houston Advance Research Center in Houston, Tex. and is capable of compressing photographic data with an image compression ratio of up to 400:1.

Because the portable data collection device 10 is adapted for use in remote on-site locations for reading a dataform identifying a particular item or capturing an image of an item, it is desirable to enable the imaging assembly 18 to also capture a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signal. Data 308 representing the compressed digitized voice signal is coupled to the serial output circuitry 296.

For a predetermined period of time after either the dataform reading trigger 36 is depressed to initiate a dataform reading session (dataform reading mode) or the imaging trigger 28 is depressed to initiate a image capture session (imaging mode), the control and selection circuitry 284 monitors the image capture trigger switch 28. If the operator depresses the trigger 28 during the predetermined period, the voice capture module 304 and voice compression circuitry 306 are activated for verbal input. As long as the operator keeps the trigger depressed, the voice capture module 304 and voice compression circuitry 306 will remain activated so that the operator can speak into the microphone 34 and provide information concerning an item whose image was captured or whose dataform was read which will be transmitted and/or stored with the corresponding image or decoded dataform. Normally, the voice capture module 304 will be used subsequent to an imaging session where the operator wants to communicate to supervisory personnel reviewing the captured image some additional information concerning the imaged item such as the item's location, a short description of the problem with the item, etc. The voice compression circuitry 306 utilizes one of a number voice compression algorithms well known to those skilled in the art.

Decoded dataform data 298, compressed image data 300 and compressed digitized voice data 308 are routed to the serial output circuitry 296 which assembles output data 310 for serial output through a serial output port 312. In portable data collection device 10 of the present embodiment (FIGS. 1–8) the serial output port 312 is coupled to an input port of a radio module 314 mounted on the control and decoder board 22 (shown schematically in FIG. 15). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc.

The control and decoder board 22 further includes exposure parameters control circuitry 316 which outputs control signals 318, 320 to the exposure period control circuitry 254 and the gain control circuitry 252 of the camera assembly 38 and a signal 322 embodying an appropriate set of reference voltages for operating the A/D converter 272. The exposure parameters control circuitry 316 includes fuzzy logic circuitry 324 which analyzes captured frames of data accessed from the frame buffer memory 274. The fuzzy logic circuitry 324 analyzes a captured frame to determines if the current exposure period of the 2D photosensor array 48, the current amplification of the video signal 250 by the gain control circuitry 252 and the reference voltages used by the A/D converter circuitry 272 are resulting in an "acceptable" captured image frame. If not, the control signal 318 is changed to adjust the exposure period of the 2D photosensor array 48 and/or the control signal 320 is changed to adjust the amplification of the video signal 250 and/or the signal 322 is changed to adjust the operation of the A/D converter circuitry 272. After the adjustment, another captured frame is analyzed by the fuzzy logic circuitry 324 and, if necessary, further adjustments are made in an iterative fashion until the camera assembly 32 produces an "acceptable" captured image. A suitable exposure parameter control circuit including fuzzy logic control circuitry is disclosed in U.S. patent application Ser. No. 08/544,618, filed Oct. 18, 1995, entitled "Extended Working Range Dataform Reader Including Fuzzy Logic Image Control Circuitry." The contents of U.S. Ser. No. 08,544,618 are incorporated in its entirety by reference.

As can be seen in FIGS. 8 and 17A, the power source 24 is coupled to the control and decoder board 22 to provide operating power to the microprocessor 266 and other circuitry mounted on the board and the radio module 314. Power circuitry 326 under the control of the microprocessor 266 is coupled through a lead 328 to the illumination assembly 42 and the camera assembly 38 to supply power to these components of the imaging assembly 18.

Figure 18:
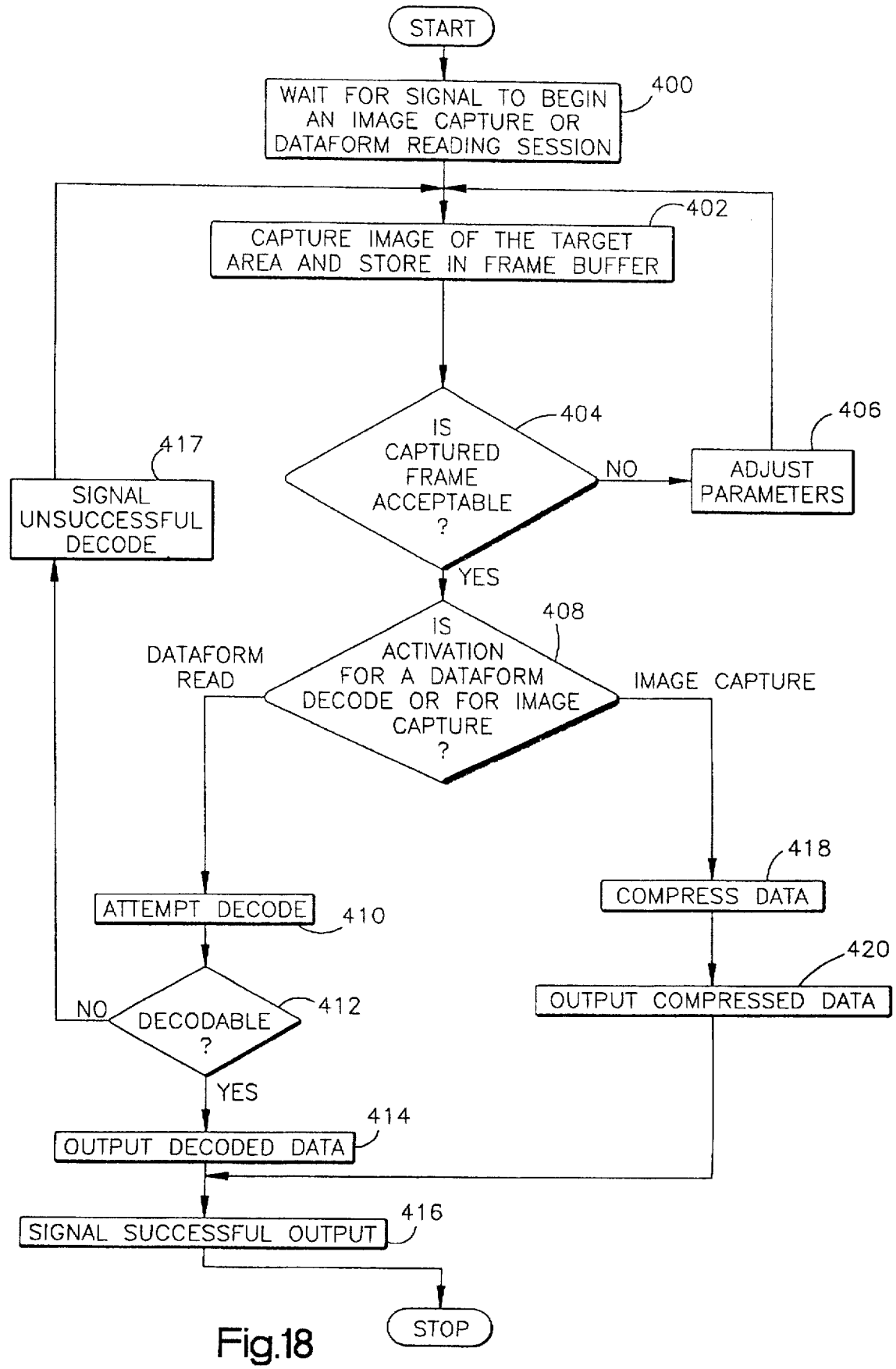
FIG. 18 is a flow chart setting forth one operating embodiment of the portable data collection device of the present invention to decode a bar code dataform and capture an image of a target area.
Figure 19:
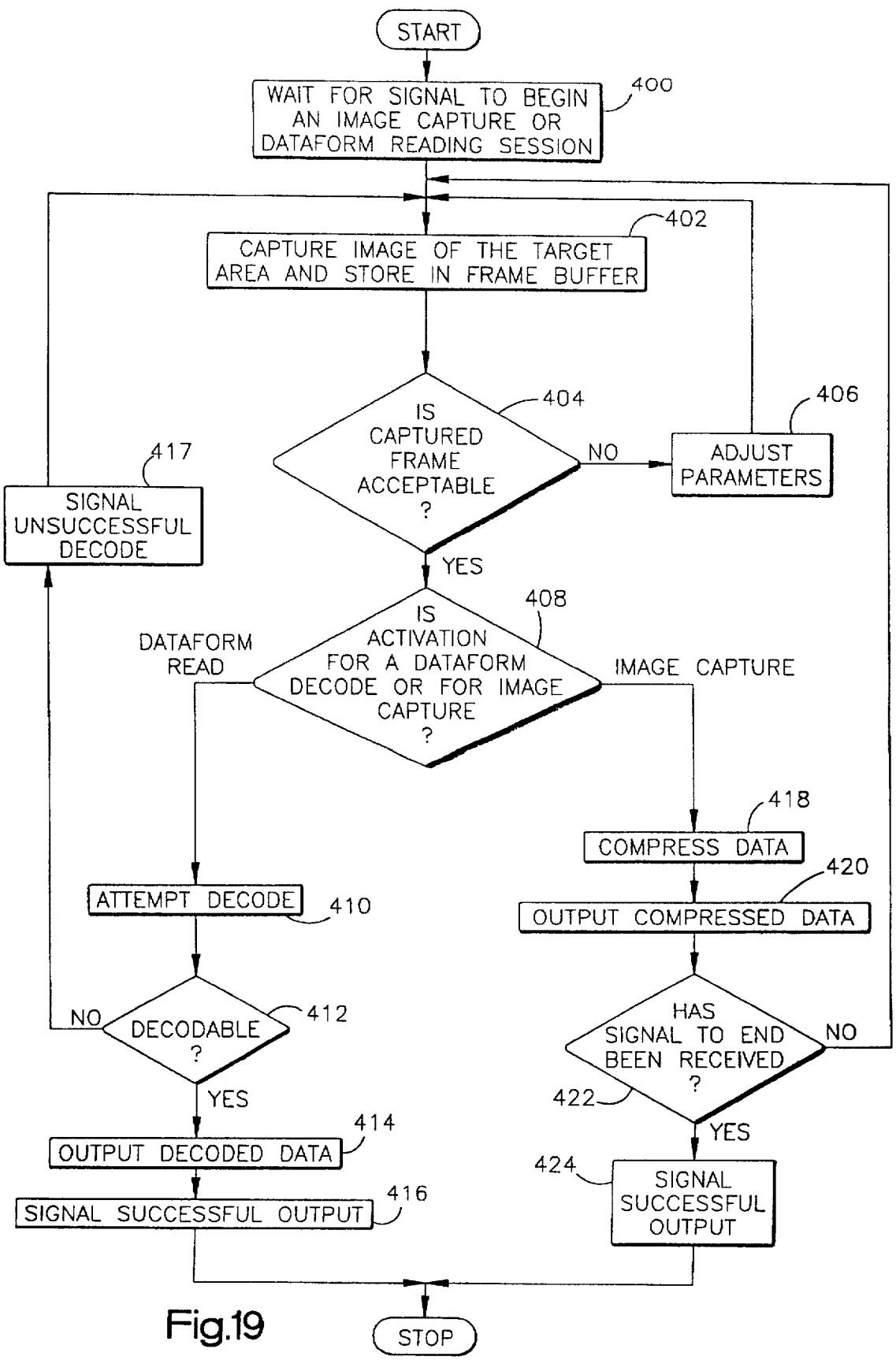
FIG. 19 is a flow chart setting forth a second operating embodiment of the portable data collection device of the present invention to decode a bar code dataform and capture an image of a target area.
Figure 20:
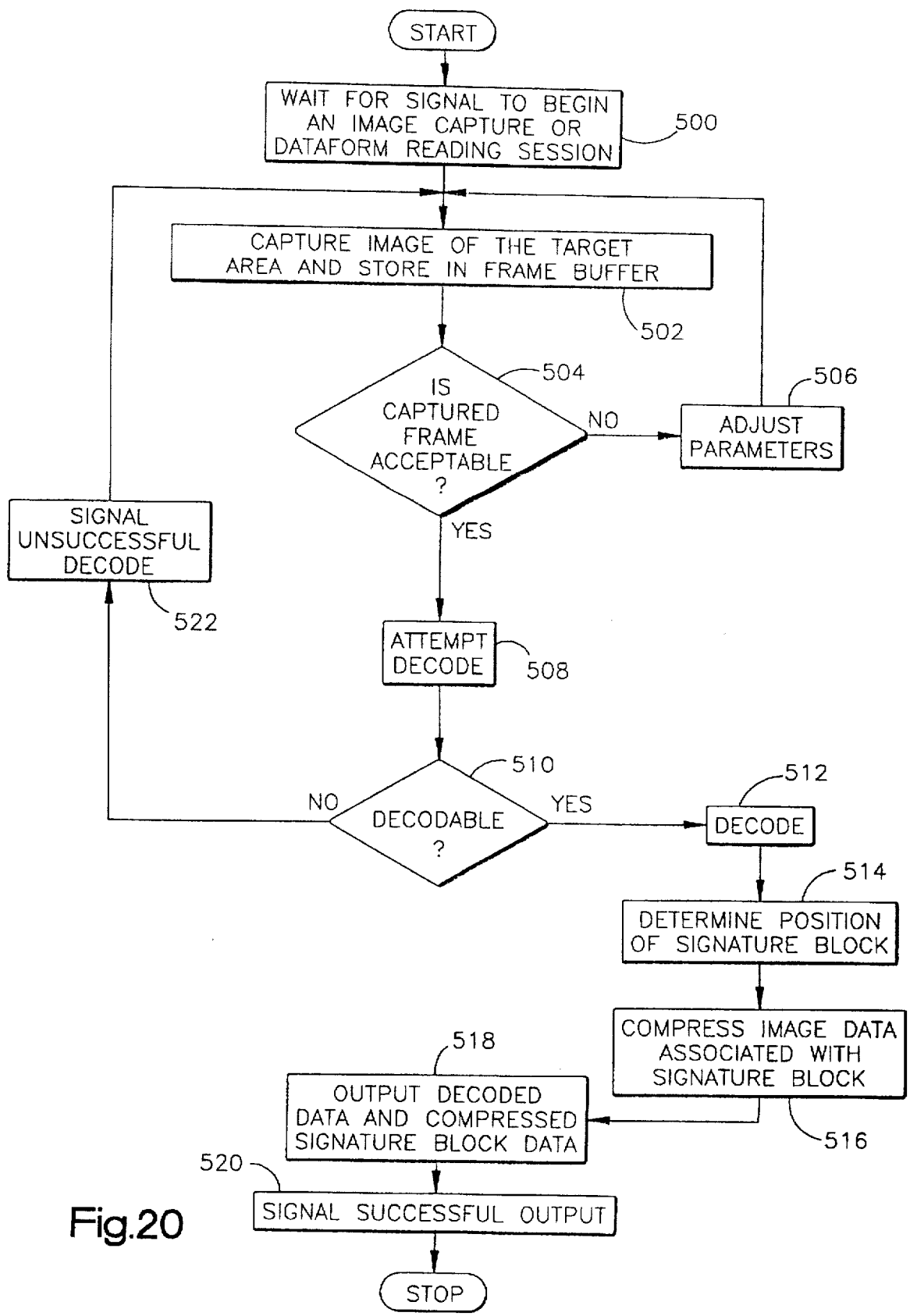
FIG. 20 is a flowchart setting forth a third operating embodiment of the portable data collection device of the present invention wherein a captured image frame includes a dataform and a signature block as shown in FIG. 16 and in which decoded dataform data and a portion of the capture image are output.

The flow chart shown in FIG. 18 illustrates the operation of the imaging assembly 18 in the dataform decoding mode and a first operating embodiment of the imaging mode. In the first operating embodiment of the imaging mode, a single frame of the image in the target area 44 is captured, compressed and output when the operator depressed the imaging trigger 28. The flow chart shown in FIG. 19 illustrates the operation of the imaging assembly 18 in the dataform decoding mode and a second operating embodiment of the imaging mode. In the second operating embodiment of the imaging mode, successive frames of the image in the target area 44 are captured, compressed and output as long as the operator has the imaging trigger 28 depressed. The flowchart in FIG. 20 illustrates a third operating embodiment in which the imaging assembly is actuated in the dataform reading mode and to decode a dataform within the image area and to capture the digital image dataform selected image area such as a signature box. The imaging system 18 determines a position of the dataform in the target area and then determines the position of the signature box. The digital image data corresponding to the portion of the image area including the signature box is output in either compressed or noncompressed form through the serial output port 312.

The imaging mode is advantageously employed when the operator using the portable data collection device 10 notices the item 46 is damaged, out of place, incomplete, etc. The imaging mode of the imaging assembly 18 is used to capture an image of the item 46 and, using the radio module 314, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc.

Turning to the first operating embodiment of the imaging mode shown in FIG. 18, at 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. At 402, upon receiving an appropriate signal, the imaging assembly 18 is activated and a frame of image data captured and stored in the frame buffer memory 274.

At 404, the fuzzy logic circuitry 324 determines if the captured image frame is acceptable, that is, the image is within predetermined acceptable ranges for brightness and the magnitude of charges on the photosensors of the 2D photosensor array 48. If the fuzzy logic circuitry 324 determines the captured frame is not acceptable, one or more of the operating parameters of the camera assembly 38 and the A/D converter circuitry 272 are modified as shown at step 406. The loop represented by steps 402, 404, 406 are repeated until the captured frame is determined to be acceptable.

At step 408, if the control and selection circuitry 284 determines that the activation signal is from the dataform reading trigger 26 requiring a dataform decode, the captured frame is coupled to the image processing and decoder circuitry 290 for attempted decoded of the dataform represented in the captured frame. At step 410, the decoding circuitry 292 attempts to decode the dataform represented in the captured frame. At step 412, a determination is made if the decoding was successful. At step 414, if the decoding was successful, the extracted decoded data is output to the serial output circuitry 296 and at step 416, the green LED indicator 32 is energized for a predetermined time to signal the operator that the dataform 45 in the target area 44 has been successfully read. Subsequently, the imaging assembly 18 is turned off.

If at step 412, the decoding was not successful, the selection circuitry at energizes the red LED indicator 30 for a predetermined time to signal to the operator that the decoding was unsuccessful and that he or she should continue to point the device 10 at the dataform 45 in the target area 44. The process returns to step 402 where another image frame is capture and the remaining steps are repeated.

If at step 408, the control and selection circuitry 284 determines that the activation signal is from the imaging trigger 28, the captured frame is routed to image compression circuitry 294 to compress the data in the captured frame, shown at step 418. At step 420, the compressed image data is output to the serial output circuitry 296 and the green LED indicator 32 is energized to signal the operator that the image in the target area 44 has been successfully captured.

Referring to FIG. 19, in a second operating embodiment of the imaging mode, successive frames of an image of the target area 44 are captured for as long as the operator maintains the imaging trigger 28 depressed. This operating embodiment would be advantageous in situations where the item 46 which the operator wishes to image because of some defect, damage, etc., is very large compared to the area of the target area 44. Therefore, capturing a single image frame and transmitting a signal corresponding to the captured frame to a remote device or supervisory review may not provide supervisory personnel with an image covering a large enough portion of the item 46 to ascertain the problem and determine appropriate corrective action. By capturing successive frames during the period that the operator keeps the imaging trigger 28 depressed, the operator may move the portable data collection device 10 with respect to the item 46 to provide a video image of the complete item (or an image of as much of the item as necessary to provide for identification of the item and the item's problem).

For this embodiment, the process remains generally the same as the embodiment described in connection with FIG. 18. However, after the output of compressed data to the serial output circuitry 296 at step 420, the control and selection circuitry 284, at step 422, checks to see if a signal has been received from the image capture trigger circuitry 28a indicating that the operator has released the imaging trigger 28. If such a signal from the image capture trigger circuitry 28a has been received, then at 424, the control and selection circuitry 284 energizes the green LED indicator 32 for a predetermined time period to signal the operator that the image in the target area 44 has been successfully captured. Subsequently, the imaging assembly 18 is turned off.

If no signal is received from the image capture trigger circuitry 28a indicating that the operator has released the imaging trigger 28, then the process loops back to step 402 and successive image frames are captured, compressed and output to the serial output circuitry 296 until such time as the control and selection circuitry 284 received the signal from the image capture trigger circuitry 28a indicating that the imaging trigger 28 has been released.

As can best be seen in FIGS. 15 and 17A, the imaging assembly 18 includes the camera assembly 38 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 8) mounted on the control and decoder board 22 and operated by the microprocessor 266. Alternately, the circuitry of the imaging assembly 18 may comprise separate application-specific integrated circuitry (ASIC) mounted on the control and decoder board 22.

Figure 16:
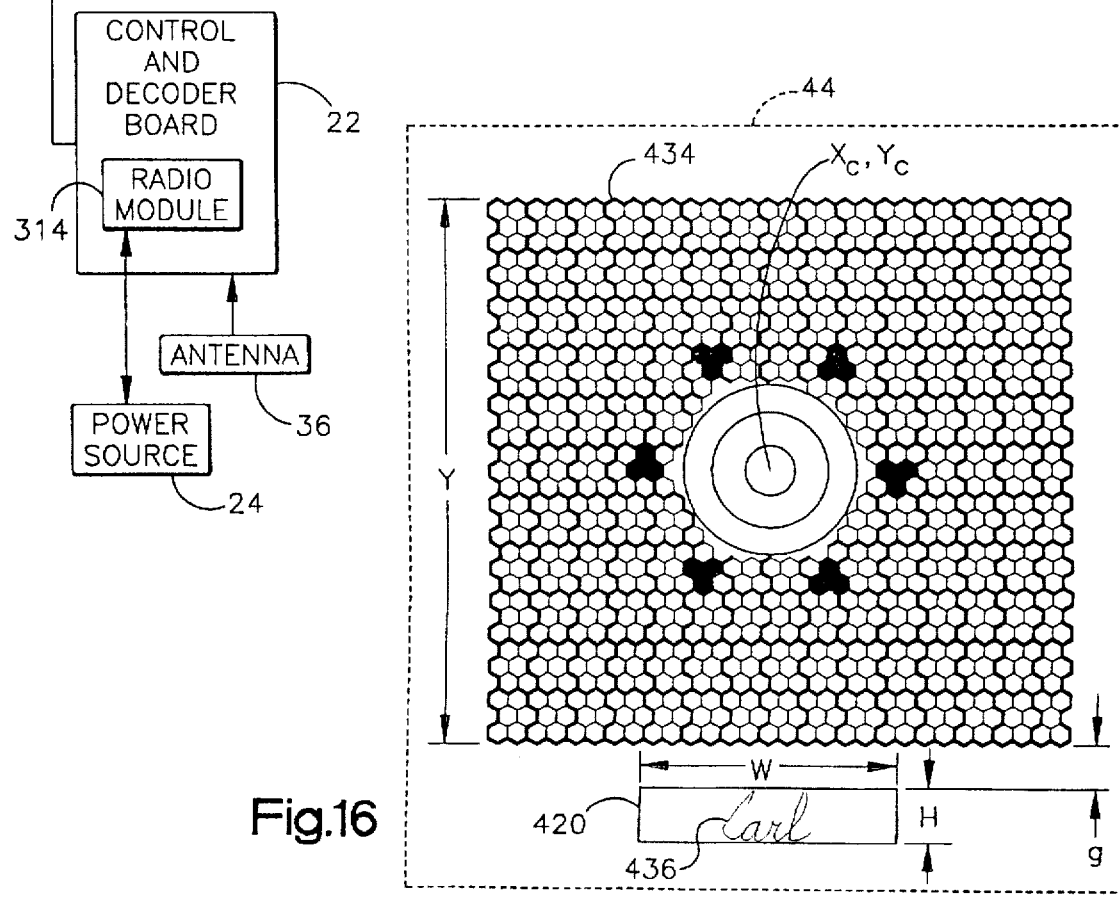
FIG. 16 is a representation of a matrix dataform and an associated signature block.

In the third operating embodiment of the portable data collection device 10 of the present invention, the dataform decoding mode is actuated to capture, compress and output an image contained within the boundary of an image area associated with a dataform. For example, the desired image area may be a signature block positioned a predetermined distance from a dataform. In FIG. 16, a signature block 432 is associated with a 2D dataform 434 known as MaxiCode (MaxiCode™ is a symbology standard of United Parcel Service). The signature block 420 is positioned at a predetermined location with respect to the dataform 434.

The dataform 434 is imprinted on a label affixed to a package to be delivered to a recipient. When the package is delivered, the recipient signs his or her signature 436 within a perimeter of the signature block 420. To document delivery of the package, the portable data collection device imaging assembly 18 is actuated with the dataform reading trigger 28 to image and decode the dataform 434. However, in addition to decoding the dataform 434, it would be desirable to store a portion of the captured image corresponding to the image within the signature block 320 to prove the recipient's acknowledgement of receipt of the package.

In the third operating embodiment, the imaging assembly 18 will capture an image of the target area 44 including both the dataform 434 and the signature block 420. The output data sent to the serial output circuitry 296 will include the decoded dataform and a compressed digital image of the image within the signature block 420, i.e., the signature 436.

FIG. 20 is a flowchart summarizing this third operating embodiment. At step 500, the imaging assembly 18 waits for the start of a dataform read session which is typically initiated by the operator pulling the dataform reading trigger switch 26. After imaging the target area 44, at step 502, a frame of an image of the target area 44 is captured and a digital representation is stored in the frame buffer memory 274. The fuzzy logic control circuitry 324 determines if the captured image frame is acceptable for decoding at step 504. If the frame is not acceptable, parameters are adjusted at step 506.

If the captured image frame is acceptable for decoding at step 508, the decoding circuitry 292 attempts to decode cell data values associated with illumination intensity data values stored in the frame buffer memory 274. At step 510, if the cell data values are decodeable, then, at step 512, decode of the dataform 434 occurs. The signature block 420 is located at a predetermined position with respect to the dataform 434, that is, the location, size and/or orientation of the signature block 420 with respect to the dataform 434 is fixed. Data representative of the predetermined position may be encoded in the dataform or may be preprogrammed into the portable data collection device's application software. Also included in the dataform are certain distinguishing features that permit locating the dataform 434 in the target area, for example, the "bulls eye" mark at the MaxiCode center.

Other dataform formats would include different distinguishing features such a guard bar for PDF-417 or Super Code dataforms or orientation markers for data matrix dataforms. As a result of the predetermined position data in conjunction with the distinguishing features of the dataform, the location, size and/or orientation of the signature block 420 within the target area 44 is determined at step 514, is determined. At step 516, a digital representation of the portion of the image corresponding to the signature block 420 is coupled to the image compression circuitry 294 for data compression.

The compressed image data representing the signature block 420 and at least a portion of the decoded dataform data are output to the serial output circuitry 296, at step 518, for subsequent transmission by the radio module 314 to a remote device. At step 520, the green LED 32 is energized for a predetermined time signaling to the operator that the dataform 434 was successfully decoded and an image of the signature block 420 was successfully captured and output, to the serial output circuitry 296. If the captured frame is not decodeable at step 510, the red LED 30 is energized for a predetermined time to inform the operator that the read was unsuccessful and to maintain the dataform reading trigger 26 depressed and keep the data collection device 10 aimed at the dataform 434 until a successful read is obtained.

It should be appreciated that because the predetermined positional data for a desired image area such as a signature block located at a predetermined position with respect to a dataform may be preprogrammed into the portable data collection device, digital image data of a portion of the desired image area may be output without the necessity of decoding the dataform. After storing a digital representation of the target area 44 and locating the distinguishing features of the dataform 434, the location of the signature block 420 can be calculated based on the pre-programmed predetermined position data and the location of the distinguishing features of the dataform.

Regardless of whether predetermined positional data is preprogrammed into the data collection device 10 or encoded in the dataform. There will be uses for the device 10 this invention wherein only some of the codes will have associated desired image areas. Therefore, it is desirable for a dataform to include an indication as to whether there exists an associated desired image area to be captured and output. The indication may be encoded in the dataform or the dataform format itself may be the indication. For example, all MaxiCode formats may be known to have an associated desired image area which is to be captured and output.

In the signature block placement of FIG. 16, the block is centered below the dataform 434 at a distance "g" from the dataform. The height of the block is H and the width is W. The dataform is of a predetermined size having a height "Y". To locate the signature block 420 in the target field 44, coordinate locations of the center ($x_c$, $y_c$) and the height of the dataform "Y" are determined in the pixel coordinate domain. Then, the formulas for calculating the positions of the four corners of the signature box in the pixel coordinate domain are as follows:

Upper-left corner: ($x_l - x_c$, $y_u - y_c$)=($-W/2$, $Y/2+g$)

Upper-right corner: ($x_r - x_c$, $y_u - y_c$)=($W/2$, $Y/2+g$)

Lower-left corner: ($x_l - x_c$, $y_l - y_c$)=($-W/2$, $Y/2+g+H$)

Lower-right corner: ($x_r - x_c$, $y_l - Y_c$)=($W/2$, $Y/2+g+H$) The formulas to correct each x or y value for angular rotation θ is as follows:

$$(x') = (\cos \theta - \sin \theta)(x - x_c) + (x_c)$$

$$(y') = (\sin \theta - \cos \theta)(y - y_c) + (y_c)$$

An alternate embodiment of the portable data collection device of the present invention is shown in FIGS. 21–24. Similar reference numbers will be used to describe this embodiment as were used in the embodiment shown in FIGS. 1–8. A portable data collection device including a workslate computer is shown generally as 10' in FIGS. 21–24. The data collection device 10' includes a housing 12' defining an interior region. The housing 12' includes an upper surface 12a' and a lower surface 12b' separated by a side wall 12c'. A portion 12d of the lower surface 12b' is bowed outwardly to provide additional space in the interior region. A side wall 12e' of the bowed portion 12d includes an opening through which a portion of an optics assembly 43' and a portion of an illumination assembly 42' extend.

The optic assembly 43' and the illumination assembly 42' are components of the modular portion 20' of a two dimensional (2D) imaging assembly 18'. The upper surface 12a' includes an opening through which a touch sensitive display screen 13' is visible which can be used to view output data and graphic displays as well as input data and commands to a microprocessor in the interior region which controls functioning of the device 10'. Input of data and commands to the microprocessor may also be accomplished through a keypad 15' having a plurality of keys which are supported on the upper surface 12a'.

A dataform reading trigger or actuator 26' extends through an opening in the upper and side surfaces 12a', 12c'. On an opposite side of the display screen 13' is an imaging trigger or actuator 28' extends through an opening in the upper and side surfaces 12a', 12c'.

The upper surface 12a' includes two small openings through which a distal portion of a red light emitting diode (LED) indicator 30' and a distal portion of a green LED indicator 32' extend. Finally, the upper surface 12a' of the housing 12' includes an opening exposing a portion of a microphone 34' mounted in the housing interior region. The interior region of the housing 12' supports the imaging assembly 18' and other electronic circuitry. In both embodiments of the portable data collection device 10, 10', the imaging assembly 18, 18' and associated circuitry are identical and it should be understood that descriptions thereof apply equally to both embodiments. A major distinction between the two embodiments is that the serial digital output data 310 is coupled to an input port of a terminal processing board (not shown) within the workslate. The processing board may further process the data 310 and store the resulting processed data. After completing a work shift, an operator may drop of the device 10' where the processed data will be downloaded from the processing board memory for updating records and/or analysis of stored image representations. Alternatively, the workslate may include a radio for telemetering data to a remote location.

The workslate 10' also includes a viewing assembly. As can be seen in FIG. 21, a portion 704 of the display screen 13' displays an image of a target area of the imaging assembly 18' when a trigger switch 706 extending through the side wall 12c' is depressed. The imaging assembly remains on until the trigger switch 706 is depressed again, turning the imaging assembly off.

Figure 29:
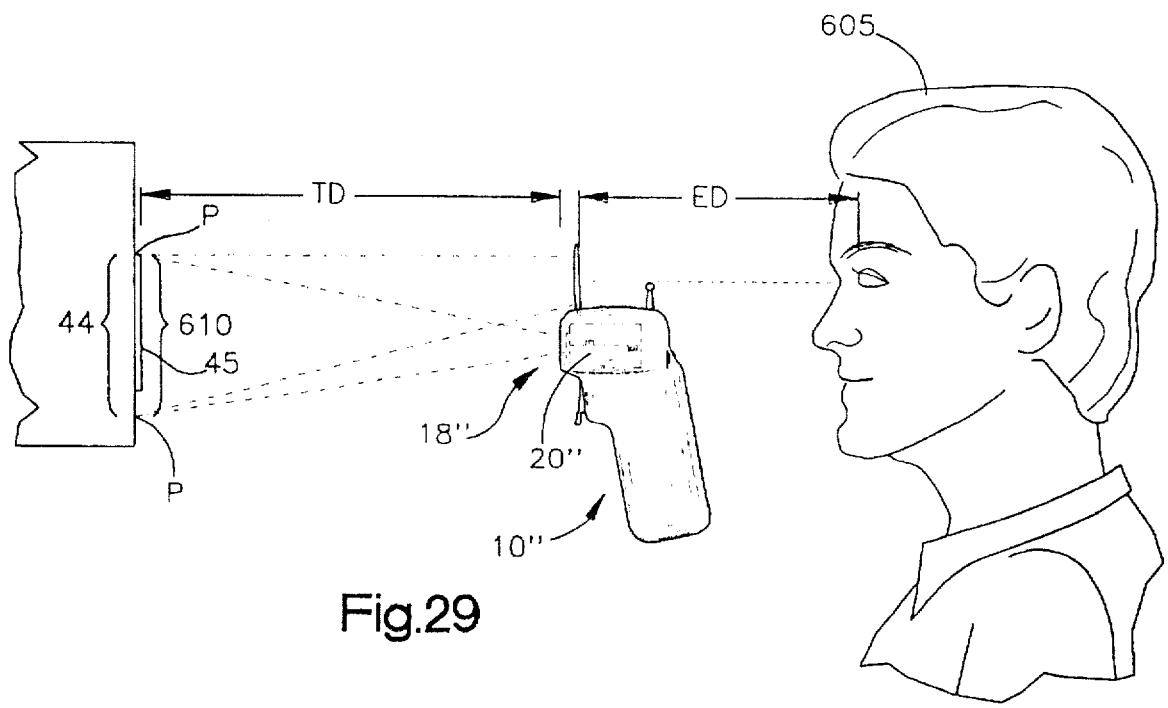
FIG. 29 is a perspective view of a the portable data collection device of FIG. 25 showing use of the viewing assembly to align the device with a target object.

A second embodiment of a viewing assembly 600 of the portable data collection device 10" of the present invention is shown in FIGS. 25-29. The device 10" includes a housing 12" comprising a lower gripping portion 14" and an upper snout 16". The snout 16" supports a modular portion 20" of an imaging assembly 18". The viewing assembly 600 includes a pivoting member 602 which pivots between a folded down position (FIGS. 25 and 27) and an upright position (FIGS. 26 and 28). The pivoting member 602 includes a rectangular opening 604. The opening 604 is approximately 32 mm. in the horizontal direction, labeled 606 in FIG. 26, and is approximately 24 mm. in the vertical direction, labeled 608 in FIG. 26. The horizontal and vertical dimensions 606, 608 of the opening 604 are chosen such that an angle of divergence or field of view of an operator 605 looking through the opening 604 at a distance of approximately 56 mm., labeled ED in FIG. 29, is substantially the same as the field of view of the imaging assembly 18". The ratio of the horizontal dimension 606 to the vertical dimension 609 is chosen to correspond to the ratio of the horizontal dimension to the vertical dimension of the matrix of photosensors comprising the 2D photosensor array 48.

As can be seen in FIG. 29, when in an upright position, the pivoting member 602 is in a line of vision of the operator 605. When the opening 604 is position approximately 56 mm. from the operator's eye, a viewing area 610 through the aperture 604 substantially corresponds to the target area 44 of the imaging assembly 18".

The pivoting member 602, when in the folded down position, is received in a well or recessed area 608 defined by an upper surface of the housing snout 16". In the folded down position, an upper surface 612 (FIG. 28) of the pivoting member 602 is substantially flush with the snout upper surface. The snout upper surface 610 includes a recessed portion 614 (FIGS. 25 and 26) sized to permit an operator's finger tip to slip under a front lip 616 of the pivoting member 602 to permit the member to be popped up to the upright position from the folded down position. As can best be seen in FIGS. 27 and 28, the pivoting member front lip 616 member 602 fits under a slightly extending upper edge 617 of the snout upper surface to hold the pivoting member with a slight interference fit in the folded down position.

The pivoting member 602 pivots on a pair of cylindrical portions 618 which extend from sides of the pivoting member near its bottom edge. The cylindrical portions 618 rotatably fit within corresponding cylindrical recesses in the snout 16". Turning to FIGS. 27 and 28, an arcuate biasing spring 620 positioned in a recessed portion 622 of the snout 16". The recessed portion 622 is shaped to confine the spring 620 with edge portions of the snout defining the recessed portion. The spring 620 has a humped middle portion which biases the pivoting member 602 to either the upright position or the folded down position.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A portable data collection device for reading a dataform positioned in a target area, the reader comprising:

a) a housing forming an interior region, b) an imaging assembly at least partially enclosed in the interior region, for capturing an image of the dataform within a target area of the imaging assembly and providing decoded data representative of the dataform, c) a user activated actuator at least partially exposed on the exterior of the housing for actuating the imaging assembly to read a dataform, and d) a viewing assembly including a pivoting member supported by the housing, the pivoting member pivotable between an upright and a folded down position with respect to the housing and including an opening, the opening sized such that when an operator's eye is a predetermined distance from the pivoting member and the pivoting member is in the upright position a view through the pivoting member opening substantially corresponds with the target area of the imaging assembly.

2. The portable data collection device of claim 1 further including a targeting arrangement for directing an illumination intensity distribution to aid in aiming the portable data collection device, the targeting arrangement includes a first and a second targeting light emitting diode and a corresponding first and second targeting optics for focusing light from the targeting diodes, the first targeting optics focusing light from the first targeting diode to generate an illumination intensity distribution substantially in a shape of a first thin rectangle within the target area and the second targeting optics focusing light from the second targeting optics in a shape of a second thin rectangle within the target area, the first and second rectangles being substantially perpendicular.

3. The portable data collection device of claim 1 wherein the pivoting member is hingeably connected to said housing such that the pivoting member is pivoted to the upright position for use and pivoted to the folded down position when not in use and in the folded down position is substantially parallel to a portion of the housing overlied by the pivoting member.

4. The portable data collection device of claim 3 wherein the housing includes a recessed portion into which the pivoting member is received when in the folded down position.

5. A portable data collection device for reading a dataform, the device comprising:

a) a housing forming an interior region;

b) an imaging assembly at least partially enclosed in the interior region, for capturing an image of the dataform in a target area of the imaging assembly and providing decoded data representative of the dataform; and c) a viewing assembly including a member having an opening through which the target area of the imaging assembly is viewable, the opening sized such that when an operator's eye is a predetermined distance from the member a view through the opening substantially corresponds with the target area of the imaging assembly.

6. A portable data collection device for reading a dataform, the device comprising:

a) a housing forming an interior region;

b) an imaging assembly at least partially enclosed in the interior region, for capturing an image of the dataform in a target area of the imaging assembly and providing decoded data representative of the dataform;

c) a user activated actuator at least partially exposed on the exterior of the housing for actuating the imaging assembly to read a dataform; and d) a viewing assembly including a display screen supported by the housing and electrically coupled to the imaging assembly and display driver circuitry to display an image of the target area captured by the imaging assembly, the display screen being supported by a pivoting member which is hingeably connected to the housing and being pivotable between an upright position and a folded down position.

7. The portable data collection device of claim 6 wherein the pivoting member is substantially parallel to a portion of the housing overlied by the display screen.

8. The portable data collection device of claim 7 wherein the display screen is energized to display an image of the target area captured by the imaging assembly when the pivoting member is positioned in the upright position.

9. The portable data collection device of claim 8 wherein the display screen in deenergized when the pivoting member is positioned in the folded down position.

10. The portable data collection device of claim 9 further including a switch for detecting a position of the pivoting member and causing the display screen to be energized when the pivoting member is in the upright position.

11. A portable data collection device for reading a dataform, the device comprising:

a) a housing forming an interior region;

b) an imaging assembly at least partially enclosed in the interior region, for capturing an image of the dataform in a target area of the imaging assembly and providing decoded data representative of the dataform;

c) a user activated actuator at least partially exposed on the exterior of the housing for actuating the imaging assembly to read a dataform; and d) a viewing assembly including a display screen supported by the housing and electrically coupled to the imaging assembly and display driver circuitry to display an image of the target area captured by the imaging assembly.

e) a targeting arrangement for directing an illumination intensity distribution to aid in aiming the portable data collection device, the targeting arrangement including a first and a second targeting light emitting diode and a corresponding first and second targeting optics for focusing light from the targeting diodes, the first targeting optics focusing light from the first targeting diode to generate an illumination intensity distribution substantially in a shape of a first thin rectangle within the target area and the second targeting optics focusing light from the second targeting optics in a shape of a second thin rectangle within the target area, the first and second rectangles being substantially perpendicular.

* * * * *